(12) United States Patent
Shim et al.

(10) Patent No.: US 12,402,141 B2
(45) Date of Patent: Aug. 26, 2025

(54) METHOD FOR OPERATING IAB NODE CONNECTED TO PLURALITY OF PARENT NODES IN WIRELESS COMMUNICATION SYSTEM, AND APPARATUS USING METHOD

(71) Applicant: LG ELECTRONICS INC., Seoul (KR)

(72) Inventors: Jaenam Shim, Seoul (KR); Hyangsun You, Seoul (KR); Hyunsoo Ko, Seoul (KR); Suckchel Yang, Seoul (KR); Seonwook Kim, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 372 days.

(21) Appl. No.: 17/911,932

(22) PCT Filed: Apr. 6, 2021

(86) PCT No.: PCT/KR2021/004266
§ 371 (c)(1),
(2) Date: Sep. 15, 2022

(87) PCT Pub. No.: WO2021/206412
PCT Pub. Date: Oct. 14, 2021

(65) Prior Publication Data
US 2023/0180248 A1    Jun. 8, 2023

(30) Foreign Application Priority Data

Apr. 7, 2020  (KR) .................. 10-2020-0042361
Jan. 19, 2021  (KR) .................. 10-2021-0007245

(51) Int. Cl.
*H04W 72/23*    (2023.01)
*H04W 72/04*    (2023.01)
*H04W 88/08*    (2009.01)

(52) U.S. Cl.
CPC ........... *H04W 72/23* (2023.01); *H04W 72/04* (2013.01); *H04W 88/08* (2013.01)

(58) Field of Classification Search
CPC ...... H04W 72/23; H04W 72/04; H04W 88/08
(Continued)

(56) References Cited

U.S. PATENT DOCUMENTS

2019/0350023 A1    11/2019  Novlan et al.
2020/0045766 A1    2/2020   Kim et al.
(Continued)

FOREIGN PATENT DOCUMENTS

| CN | 110536351 | 12/2019 |
| CN | 110536466 | 12/2019 |

(Continued)

OTHER PUBLICATIONS

Japan Patent Office Application No. 2022-561158, Office Action dated Jun. 27, 2023, 2 pages.
(Continued)

*Primary Examiner* — Samina F Choudhry
(74) *Attorney, Agent, or Firm* — LEE, HONG, DEGERMAN, KANG & WAIMEY

(57) ABSTRACT

Provided are a method for operating an IAB node connected to a plurality of parent nodes in a wireless communication system, and an apparatus using the method. The method comprises: monitoring all pieces of AI-DCI respectively received from the plurality of parent nodes; and determining whether or not a soft resource is available to a DU of the IAB node, in consideration of all results of the monitoring.

15 Claims, 30 Drawing Sheets

(58) Field of Classification Search
USPC .......................................................... 370/329
See application file for complete search history.

(56) References Cited

U.S. PATENT DOCUMENTS

| 2020/0100298 | A1  | 3/2020  | Pan et al. |            |
|--------------|-----|---------|------------|------------|
| 2021/0176746 | A1* | 6/2021  | Abedini    | H04W 28/18 |
| 2022/0201681 | A1* | 6/2022  | Harada     | H04W 72/046 |
| 2023/0345553 | A1* | 10/2023 | Maya       | H04W 16/26 |

FOREIGN PATENT DOCUMENTS

| CN | 110663206    | 1/2020  |
|----|--------------|---------|
| KR | 1020200014194 | 2/2020  |
| WO | 2019194737   | 10/2019 |
| WO | 2020005410   | 1/2020  |
| WO | 2020032580   | 2/2020  |

OTHER PUBLICATIONS

Qualcomm Incorporated, "Further topics on IAB resource management," 3GPP TSG RAN WG1 Meeting #98bis, R1-1911102, Oct. 2019, 7 pages.

Huawei, HiSilicon, "Corrections on resource multiplexing among backhaul and access links," 3GPP TSG-RAN WG1 Meeting #100-e, R1-2001038, Feb. 2020, 7 pages.

ZTE, "Remaining issues in IAB resource multiplexing," 3GPP TSG-RAN WG1 #100-e, R1-2000400, Feb. 2020, 5 pages.

Huawei, HiSilicon, "Correction of TS 37.340 on the support of MR-DC for IAB," SGPP TSG-RAN WG2 #109, Electronic, R2-2000526, Feb. 2020, 8 pages.

PCT International Application No. PCT/KR2021/004266, International Search Report dated Jul. 9, 2021, 4 pages.

Korean Intellectual Property Office Application No. 10-2022-702710, Notice of Allowance dated Sep. 12, 2023, 3 pages.

Ericsson, "IAB resource configuration and multiplexing," 3GPP TSG-RAN WG1 Meeting #97, R1-1906588, May 2019, 10 pages.

Huawei et al., "Resource multiplexing between backhaul and access in IAB," 3GPP TSG RAN WG1 Meeting #99, R1-1911856, Nov. 2019, 7 pages.

Nokiai et al., "Mechanism for resource multiplexing among backhaul and access links," 3GPP TSG RAN WG1 Meeting #99, R1-1912716, Nov. 2019, 13 pages.

AT&T, "Summary #3 of 7.2.3.1—Mechanisms for resource multiplexing among backhaul and access links," 3GPP TSG RAN WG1 Meeting #99, R1-1913503, Nov. 2019, 17 pages.

State Intellectual Property Office of the People's Republic of China Application Serial No. 202180025567.2 Notice of Allowance dated Sep. 12, 2024, 5 pages.

Chen Ximing, "A Resource Isolation Approach in File System for Docket Container" A Thesis submitted in Partial Fulfillment of the Requirements for the Degree of Master of Engineering, Huazhong University of Science & Technology, May 2019, 16 pages.

Huawei et al., "Resource multiplexing between blackhaul and access in IAB," 3GPP TSG RAN WG1 Meeting #96bis, R1-1903938, Apr. 2019, 12 pages.

* cited by examiner

METHOD FOR OPERATING IAB NODE CONNECTED TO PLURALITY OF PARENT NODES IN WIRELESS COMMUNICATION SYSTEM, AND APPARATUS USING METHOD

CROSS-REFERENCE TO RELATED APPLICATIONS

This application is the National Stage filing under 35 U.S.C. 371 of International Application No. PCT/KR2021/004266, filed on Apr. 6, 2021, which claims the benefit of earlier filing date and right of priority to Korean Application Nos. 10-2020-0042361, filed on Apr. 7, 2020, and 10-2021-0007245, filed Jan. 19, 2021, the contents of which are all incorporated by reference herein in their entireties.

BACKGROUND OF THE DISCLOSURE

Field of the Disclosure

The present disclosure relates to a method of operating an IAB node connected to a plurality of parent nodes in a wireless communication system, and an apparatus using the method.

Related Art

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultra-reliable and low latency communication (URLLC) is discussed. This new technology may be called new radio access technology (new RAT or NR) in the present disclosure for convenience.

In NR, massive MIMO or multi-beam may be used, and a very large bandwidth is expected to be available compared to LTE, and the development and deployment of integrated access and backhaul (IAB) nodes is also expected.

An IAB node may be a node that supports a wireless connection with a terminal like a repeater based on a wireless backhaul (connection with a parent node or a donor node) supporting multi-hop. The IAB node may include a distributed unit (DU) and a mobile terminal (MT). Here, the DU may be a part that provides a connection to a terminal or other IAB node, and the MT may be a part that provides a connection to a parent node or a donor node.

Meanwhile, the IAB node may be connected to a plurality of parent nodes. For example, the IAB node may support dual connectivity (DC) with a plurality of parent nodes. DC may refer to a technology in which an IAB node simultaneously uses radio resources provided by a plurality of base stations (or parent nodes).

On the other hand, the IAB node may have to determine who will use the soft resource among the MT and the DU. Here, the soft resource is a resource that can be preferentially used by the MT of the IAB node. When availability information on the soft resource is detected, the soft resource may be a resource that can be preferentially used by the DU of the IAB node. Availability information has conventionally been received from one parent node.

However, as described above, the IAB node may be connected to a plurality of parent nodes. In this case, the IAB node may monitor availability information on the soft resource from each of a plurality of connected parent nodes. In this case, the availability information may conflict with each other, or availability information may not be detected from some parent nodes. In this case, there is a problem in that a resource distribution scheme such as who will use the soft resource among the MT and the DU of the IAB node is ambiguous. In addition, it is necessary to define how the plurality of parent nodes will operate with the IAB node in the soft resource.

SUMMARY OF THE DISCLOSURE

Technical problem to be solved by the present disclosure is to provide a method of operating an IAB node connected to a plurality of parent nodes and an apparatus using the method.

In one aspect, provided is a method of operating an integrated access and backhaul (IAB) node connected to a plurality of parent nodes in a wireless communication system. The method includes monitoring a first availability indication-downlink control information (AI-DCI) from a first parent node among the plurality of parent nodes, monitoring a second AI-DCI from a second parent node among the plurality of parent nodes and determining whether a soft resource is available to a distributed unit (DU) of the IAB node considering both a monitoring result of the first AI-DCI and a monitoring result of the second AI-DCI.

In another aspect, provided is an IAB node connected to a plurality of parent nodes. The IAB node includes a transceiver, at least one memory and at least one processor operatively coupled with the at least one memory and the transceiver. The processor is adapted to monitor a first availability indication-downlink control information (AI-DCI) from a first parent node among the plurality of parent nodes, monitor a second AI-DCI from a second parent node among the plurality of parent nodes and determine whether a soft resource is available to a distributed unit (DU) of the IAB node considering both a monitoring result of the first AI-DCI and a monitoring result of the second AI-DCI.

In still another aspect, provided is an apparatus. The apparatus includes at least one memory and at least one processor operatively coupled with the at least one memory. The processor is adapted to monitor a first availability indication-downlink control information (AI-DCI) from a first parent node among the plurality of parent nodes, monitor a second AI-DCI from a second parent node among the plurality of parent nodes and determine whether a soft resource is available to a distributed unit (DU) of the IAB node considering both a monitoring result of the first AI-DCI and a monitoring result of the second AI-DCI.

In still another aspect, provided is at least one computer readable medium (CRM) having an instruction to be executed by at least one processor to perform operations includes: monitoring a first availability indication-downlink control information (AI-DCI) from a first parent node among the plurality of parent nodes, monitoring a second AI-DCI from a second parent node among the plurality of parent nodes and determining whether a soft resource is available to a distributed unit (DU) of the IAB node considering both a monitoring result of the first AI-DCI and a monitoring result of the second AI-DCI.

In still another aspect, provided is a method of operating a wireless communication system including a plurality of parent nodes and an IAB node connected to the plurality of parent nodes. The method includes transmitting a first availability indication-downlink control information (AI-DCI) by a first parent node among the plurality of parent nodes, transmitting a second AI-DCI by a second parent node among the plurality of parent nodes and determining, by the IAB node, whether a soft resource is available to a distributed unit (DU) of the IAB node considering both a monitoring result of the first AI-DCI and a monitoring result of the second AI-DCI.

There is no ambiguity in resource distribution for soft resources in the IAB node connected to a plurality of parent nodes. An operation that may cause unnecessary interference in the soft resource is not performed, and as a result, communication efficiency is increased.

DESCRIPTION OF EXEMPLARY EMBODIMENTS

Figure 1:
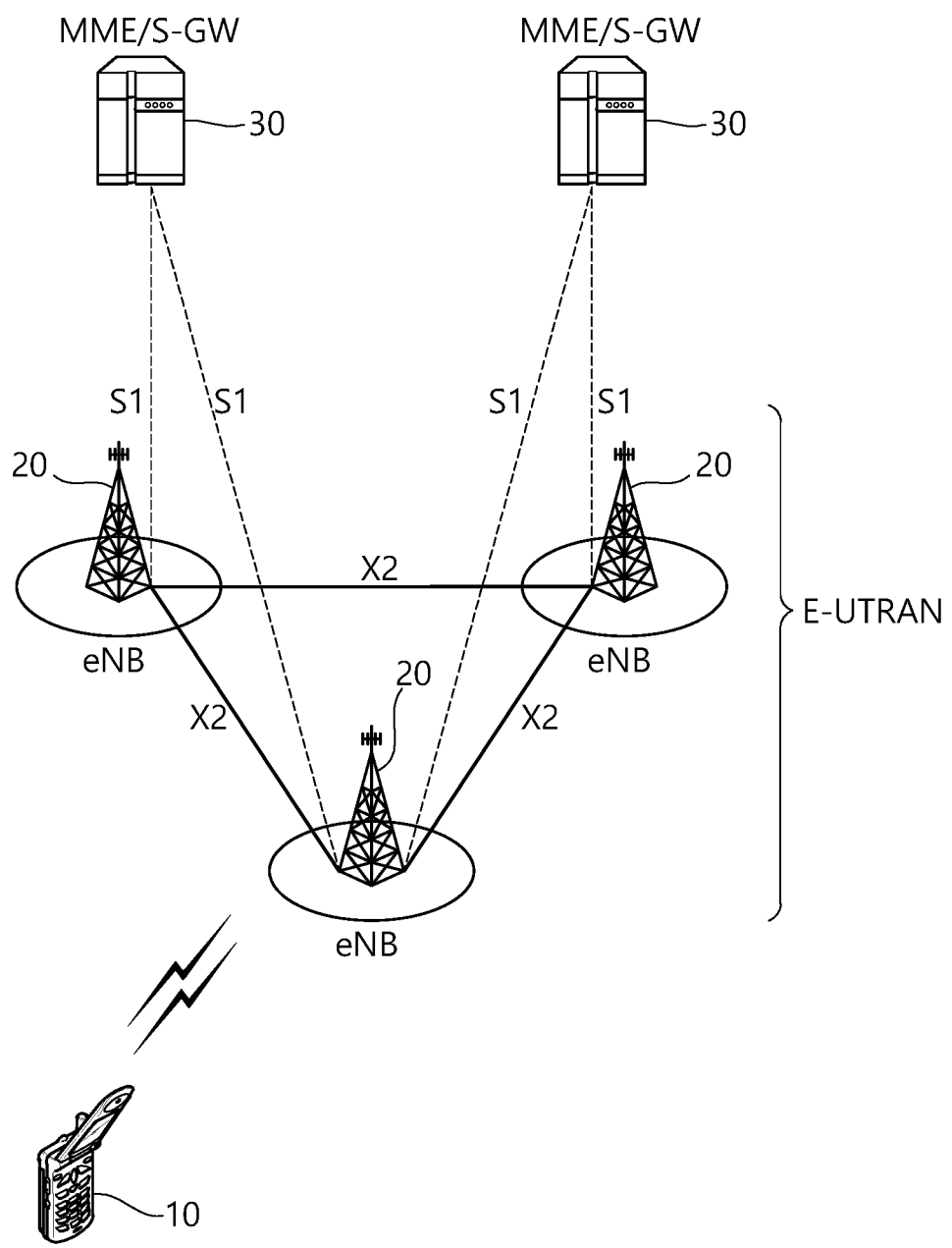
FIG. 1 illustrates a system structure of a next generation radio access network (NG-RAN) to which NR is applied.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

Technical features described individually in one figure in the present specification may be individually implemented, or may be simultaneously implemented.

The following drawings were created to explain a specific example of the present specification. The names of specific devices described in the drawings or the names of specific signals/messages/fields are presented by way of example, so that the technical features of the present specification are not limited to the specific names used in the following drawings.

The conventional wireless communication system may be referred to as an Evolved-UMTS Terrestrial Radio Access Network (E-UTRAN) or a Long Term Evolution (LTE)/LTE-A system.

The E-UTRAN includes at least one base station (BS) which provides a control plane and a user plane to a user equipment (UE). The UE may be fixed or mobile, and may be referred to as another terminology, such as a mobile station (MS), a user terminal (UT), a subscriber station (SS), a mobile terminal (MT), a wireless device, etc. The BS is generally a fixed station that communicates with the UE and may be referred to as another terminology, such as an evolved node-B (eNB), a base transceiver system (BTS), an access point, etc.

The BSs are interconnected by means of an X2 interface. The BSs are also connected by means of an S1 interface to an evolved packet core (EPC), more specifically, to a mobility management entity (MME) through S1-MME and to a serving gateway (S-GW) through S1-U.

The EPC includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

The user plane is a protocol stack for user data transmission. The control plane is a protocol stack for control signal transmission.

A PHY layer provides an upper layer (=higher layer) with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

FIG. 1 illustrates a system structure of a next generation radio access network (NG-RAN) to which NR is applied.

Figure 4:
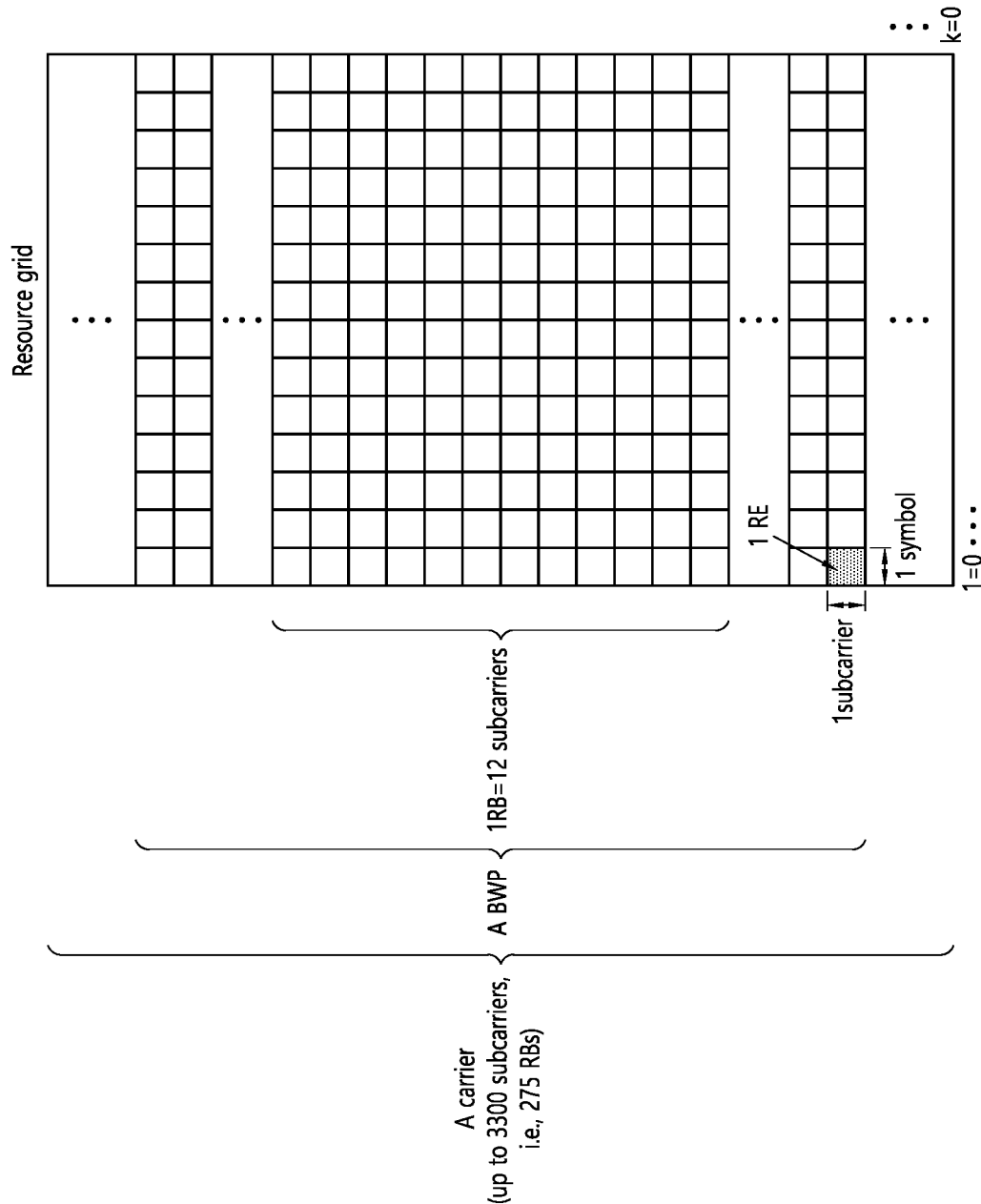
FIG. 4 illustrates a slot structure of an NR frame.

Referring to FIG. 1, the NG-RAN may include a gNB and/or an eNB that provides user plane and control plane protocol termination to a UE. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 2:
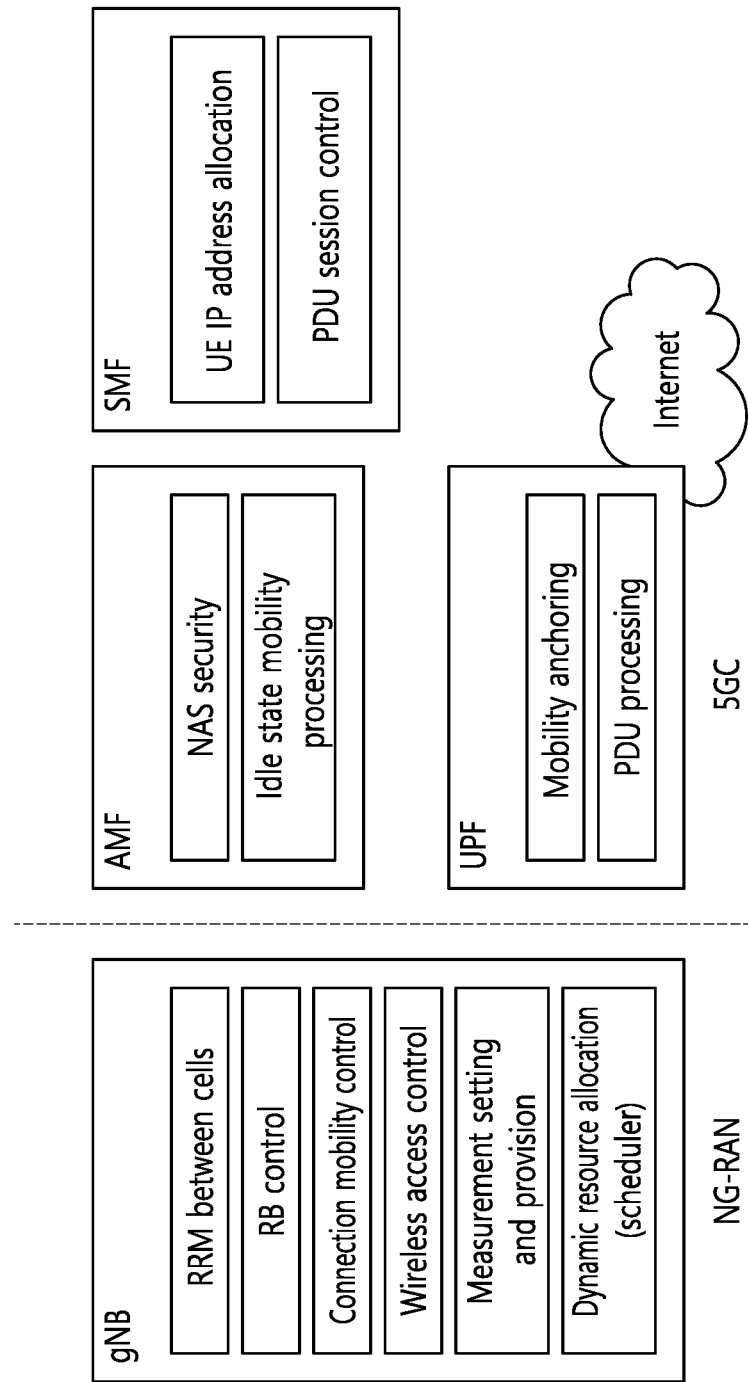
FIG. 2 illustrates a functional division between an NG-RAN and a 5GC.

FIG. 2 illustrates a functional division between an NG-RAN and a 5GC.

Referring to FIG. 2, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 3:
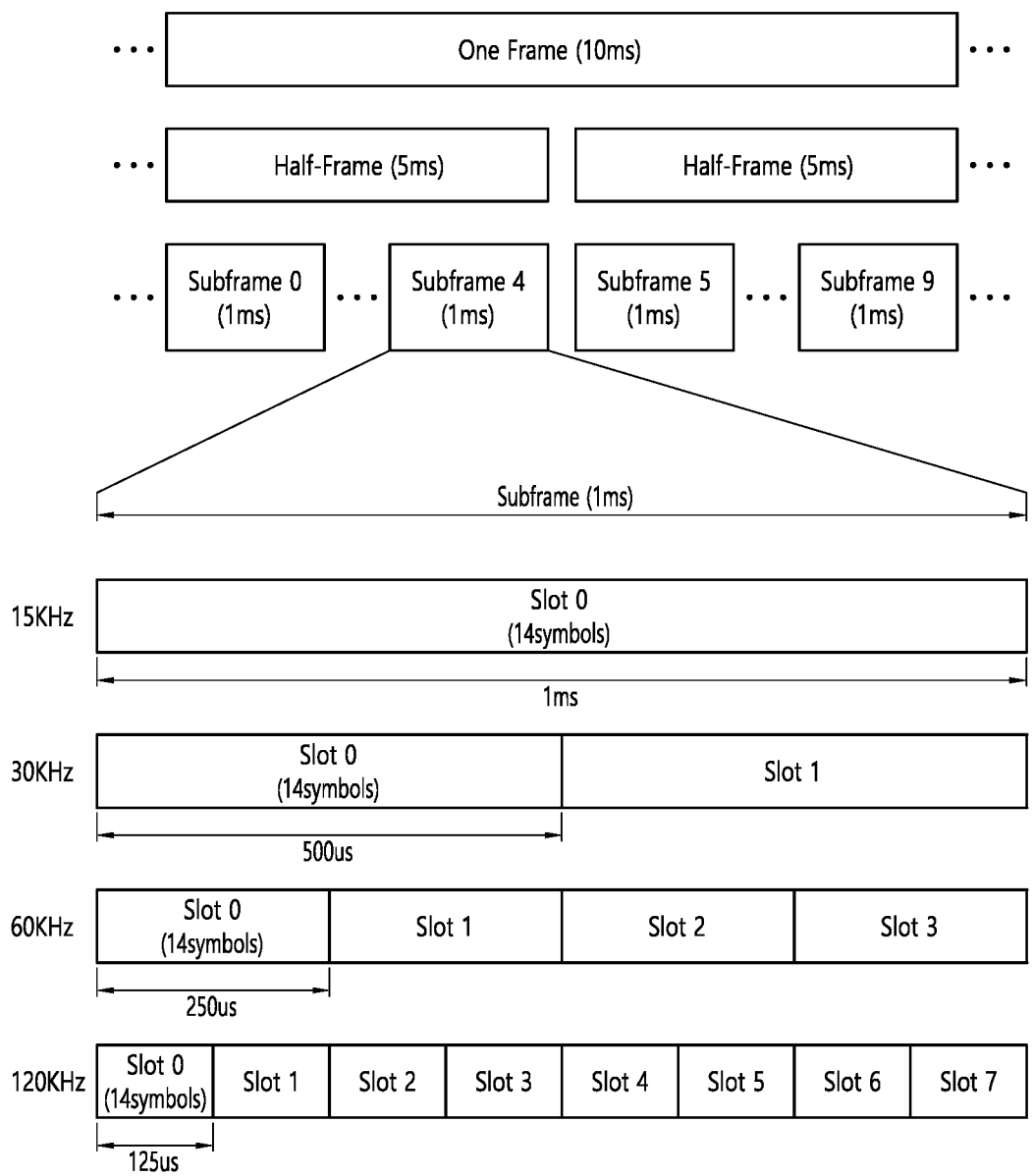
FIG. 3 illustrates an example of a frame structure that may be applied in NR.

FIG. 3 illustrates an example of a frame structure that may be applied in NR.

Referring to FIG. 3, in the NR, a radio frame (hereinafter, also referred to as a frame) may be used in uplink and downlink transmissions. The frame has a length of 10 ms, and may be defined as two 5 ms half-frames (HFs). The HF may be defined as five 1 ms subframes (SFs). The SF may be divided into one or more slots, and the number of slots within the SF depends on a subcarrier spacing (SCS). Each slot includes 12 or 14 OFDM(A) symbols according to a cyclic prefix (CP). In case of using a normal CP, each slot includes 14 symbols. In case of using an extended CP, each slot includes 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

The following table 1 illustrates a subcarrier spacing configuration μ.

TABLE 1

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$) and the like, according to subcarrier spacing configurations μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 3 illustrates a case of μ=0, 1, 2, 3.

Table 2-1 below illustrates that the number of symbols per slot, the number of slots per frame, and the number of slots per subframe vary depending on the SCS, in case of using an extended CP.

TABLE 2-1

| μ | $N^{slot}_{symb}$ | $N^{frame,\mu}_{slot}$ | $N^{subframe,\mu}_{slot}$ |
|---|---|---|---|
| 2 | 12 | 40 | 4 |

In an NR system, OFDM(A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

FIG. 4 illustrates a slot structure of an NR frame.

A slot may include a plurality of symbols in a time domain. For example, in case of a normal CP, one slot may include 7 symbols. However, in case of an extended CP, one slot may include 6 symbols. A carrier may include a plurality of subcarriers in a frequency domain. A resource block (RB) may be defined as a plurality of consecutive subcarriers (e.g., 12 subcarriers) in the frequency domain. A bandwidth part (BWP) may be defined as a plurality of consecutive (physical) resource blocks ((P)RBs) in the frequency domain, and the BWP may correspond to one numerology (e.g., SCS, CP length, and so on). The carrier may include up to N (e.g., 5) BWPs. Data communication may be performed via an activated BWP, and only one BWP may be activated for one UE. In a resource grid, each element may be referred to as a resource element (RE), and one complex symbol may be mapped thereto.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Monitoring implies decoding of each PDCCH candidate according to a downlink control information (DCI) format. The UE monitors a set of PDCCH candidates in one or more CORESETs (to be described below) on an active DL BWP of each activated serving cell in which PDCCH monitoring is configured, according to a corresponding search space set.

A new unit called a control resource set (CORESET) may be introduced in the NR. The UE may receive a PDCCH in the CORESET.

Figure 5:
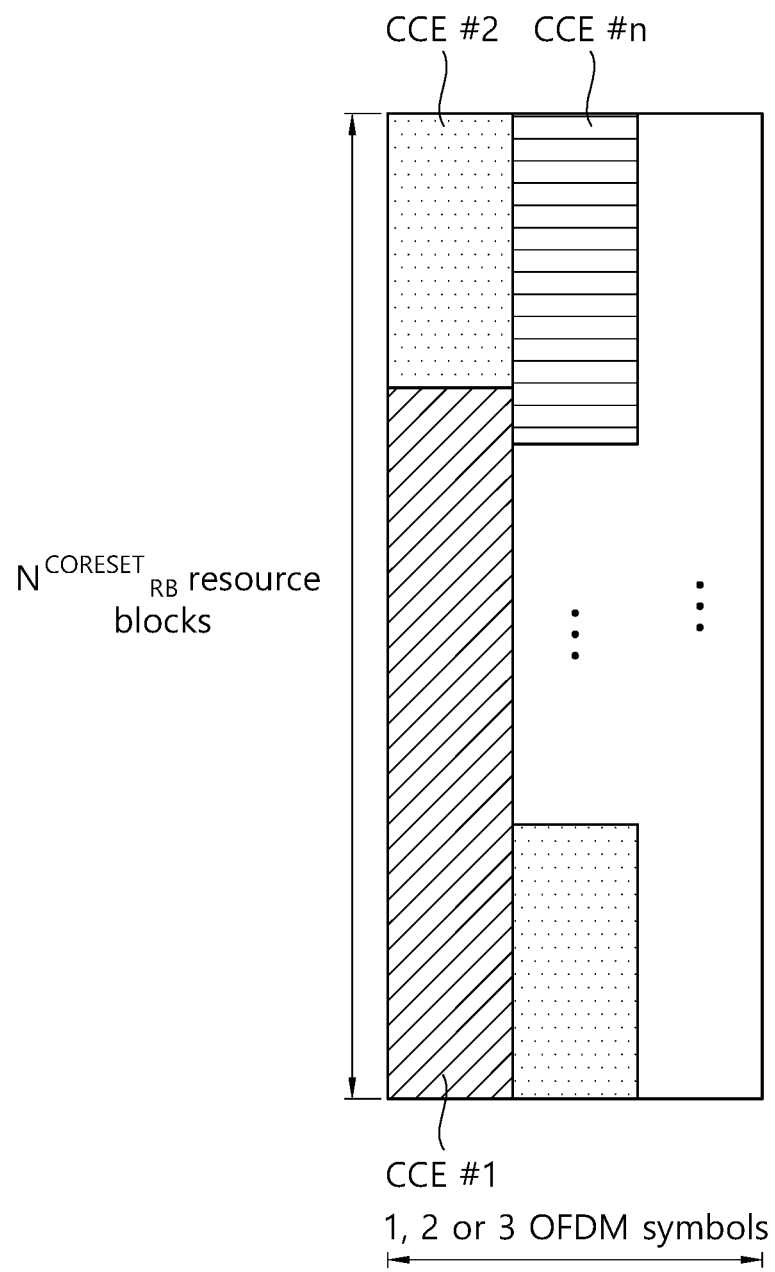
FIG. 5 illustrates CORESET.

FIG. 5 illustrates CORESET.

Referring to FIG. 5, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 5, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the UE.

Figure 6:
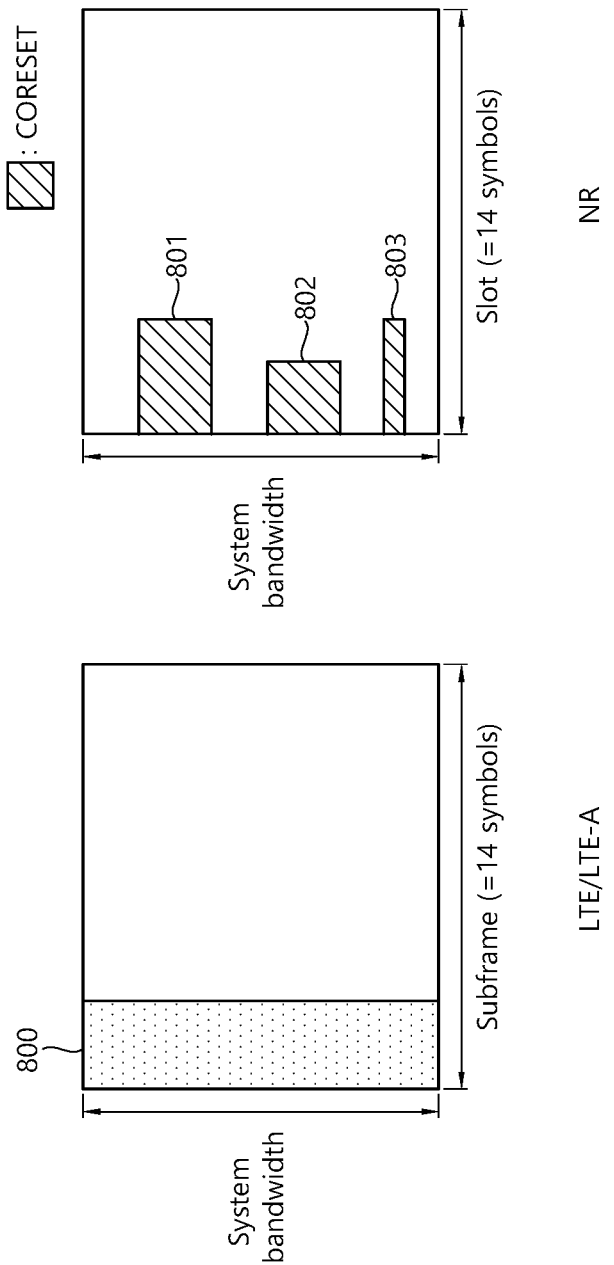
FIG. 6 is a diagram illustrating a difference between a related art control region and the CORESET in NR.

FIG. 6 is a diagram illustrating a difference between a related art control region and the CORESET in NR.

Referring to FIG. 6, a control region 800 in the related art wireless communication system (e.g., LTE/LTE-A) is configured over the entire system band used by a base station (BS). All the UEs, excluding some (e.g., eMTC/NB-IoT UE) supporting only a narrow band, must be able to receive wireless signals of the entire system band of the BS in order to properly receive/decode control information transmitted by the BS.

On the other hand, in NR, CORESET described above was introduced. CORESETs 801, 802, and 803 are radio resources for control information to be received by the UE and may use only a portion, rather than the entirety of the system bandwidth. The BS may allocate the CORESET to each UE and may transmit control information through the allocated CORESET. For example, in FIG. 6, a first CORESET 801 may be allocated to UE 1, a second CORESET 802 may be allocated to UE 2, and a third CORESET 803 may be allocated to UE 3. In the NR, the UE may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 7:
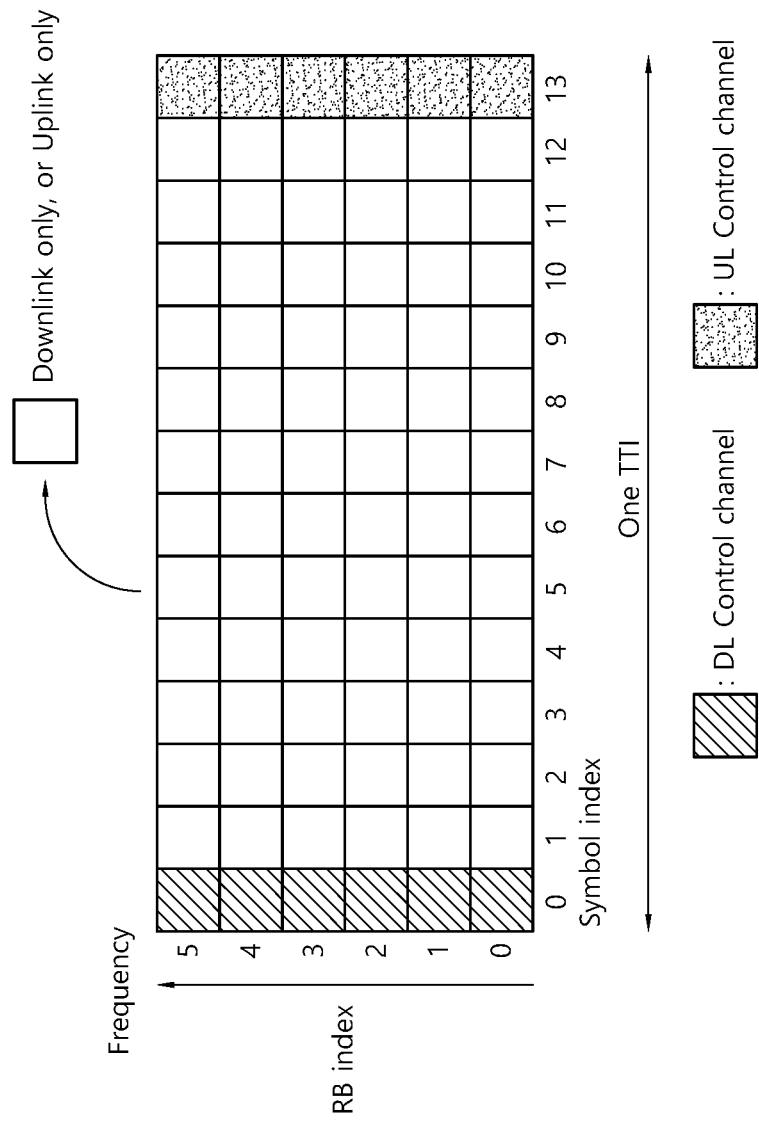
FIG. 7 illustrates an example of a frame structure for new radio access technology.

FIG. 7 illustrates an example of a frame structure for new radio access technology.

In NR, a structure in which a control channel and a data channel are time-division-multiplexed within one TTI, as shown in FIG. 7, can be considered as a frame structure in order to minimize latency.

In FIG. 7, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a UE to switch from a transmission mode to a reception mode or from the reception mode to the transmission mode may be required. To this end, some OFDM symbols at a time when DL switches to UL may be set to a guard period (GP) in the self-contained subframe structure.

Figure 8:
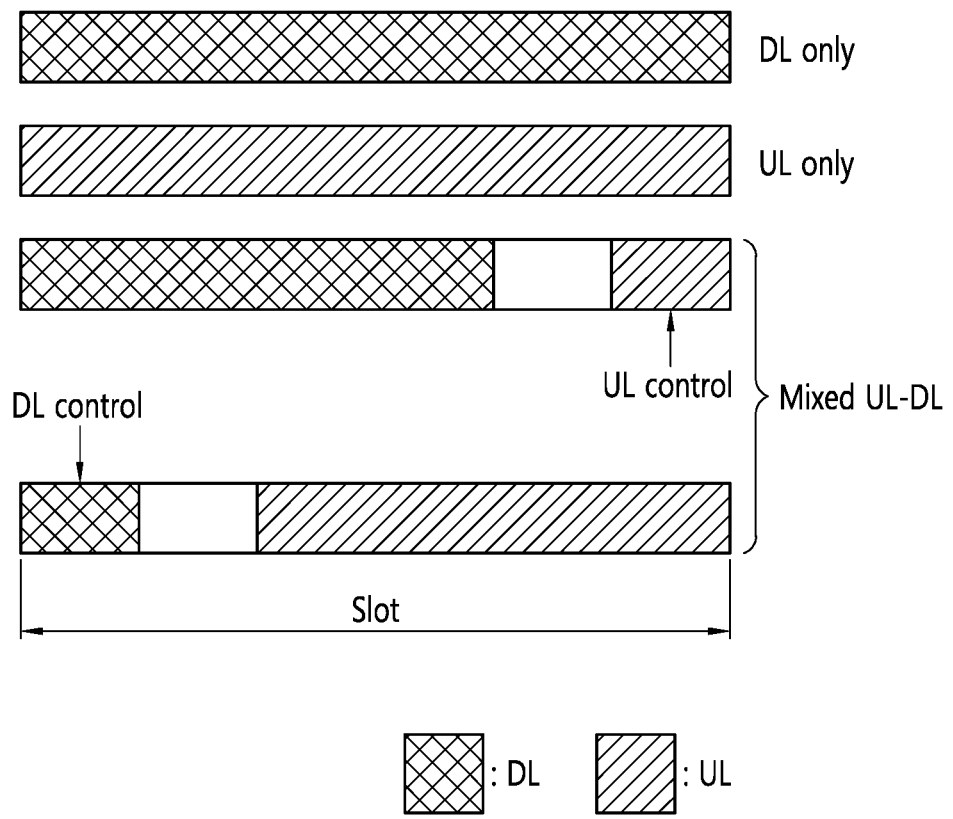
FIG. 8 illustrates a structure of a self-contained slot.

FIG. 8 illustrates a structure of a self-contained slot.

In an NR system, a DL control channel, DL or UL data, a UL control channel, and the like may be contained in one slot. For example, first N symbols (hereinafter, DL control region) in the slot may be used to transmit a DL control channel, and last M symbols (hereinafter, UL control region) in the slot may be used to transmit a UL control channel. N and M are integers greater than or equal to 0. A resource region (hereinafter, a data region) which exists between the DL control region and the UL control region may be used for DL data transmission or UL data transmission. For example, the following configuration may be considered. Respective durations are listed in a temporal order.

1. DL only configuration
2. UL only configuration
3. Mixed UL-DL configuration

DL region+Guard period (GP)+UL control region

DL control region+GP+UL region

DL region: (i) DL data region, (ii) DL control region+DL data region

UL region: (i) UL data region, (ii) UL data region+UL control region

A PDCCH may be transmitted in the DL control region, and a physical downlink shared channel (PDSCH) may be transmitted in the DL data region. A physical uplink control channel (PUCCH) may be transmitted in the UL control region, and a physical uplink shared channel (PUSCH) may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. A GP provides a time gap in a process in which a BS and a UE switch from a TX mode to an RX mode or a process in which the BS and the UE switch from the RX mode to the TX mode. Some symbols at the time of switching from DL to UL within a subframe may be configured as the GP.

In the NR, in a time domain, a synchronization signal block (SSB, or also referred to as a synchronization signal and physical broadcast channel (SS/PBCH)) may consist of 4 OFDM symbols indexed from 0 to 3 in an ascending order within a synchronization signal block, and a PBCH associated with a primary synchronization signal (PSS), secondary synchronization signal (SSS), and demodulation reference signal (DMRS) may be mapped to the symbols. As described above, the synchronization signal block may also be represented by an SS/PBCH block.

In NR, since a plurality of synchronization signal blocks (SSBs) may be transmitted at different times, respectively, and the SSB may be used for performing initial access (IA), serving cell measurement, and the like, it is preferable to transmit the SSB first when transmission time and resources of the SSB overlap with those of other signals. To this purpose, the network may broadcast the transmission time and resource information of the SSB or indicate them through UE-specific RRC signaling.

In NR, beams may be used for transmission and reception. If reception performance of a current serving beam is degraded, a process of searching for a new beam through the so-called Beam Failure Recovery (BFR) may be performed.

Since the BFR process is not intended for declaring an error or failure of a link between the network and a UE, it may be assumed that a connection to the current serving cell is retained even if the BFR process is performed. During the BFR process, measurement of different beams (which may be expressed in terms of CSI-RS port or Synchronization Signal Block (SSB) index) configured by the network may be performed, and the best beam for the corresponding UE may be selected. The UE may perform the BFR process in a way that it performs an RACH process associated with a beam yielding a good measurement result.

Now, a transmission configuration indicator (hereinafter, TCI) state will be described. The TCI state may be configured for each CORESET of a control channel, and may determine a parameter for determining an RX beam of the UE, based on the TCI state.

For each DL BWP of a serving cell, a UE may be configured for three or fewer CORESETs. Also, a UE may receive the following information for each CORESET.

1) CORESET index p (one of 0 to 11, where index of each CORESET may be determined uniquely among BWPs of one serving cell), 2) PDCCH DM-RS scrambling sequence initialization value, 3) Duration of a CORESET in the time domain (which may be given in symbol units), 4) Resource block set, 5) CCE-to-REG mapping parameter, 6) Antenna port quasi co-location indicating quasi co-location (QCL) information of a DM-RS antenna port for receiving a PDCCH in each CORESET (from a set of antenna port quasi co-locations provided by a higher layer parameter called 'TCI-State'), 7) Indication of presence of Transmission Configuration Indication (TCI) field for a specific DCI format transmitted by the PDCCH in the CORESET, and so on.

QCL will be described. If a characteristic of a channel through which a symbol on one antenna port is conveyed can be inferred from a characteristic of a channel through which a symbol on the other antenna port is conveyed, the two antenna ports are said to be quasi co-located (QCLed). For example, when two signals A and B are transmitted from the same transmission antenna array to which the same/similar spatial filter is applied, the two signals may go through the same/similar channel state. From a perspective of a receiver, upon receiving one of the two signals, another signal may be detected by using a channel characteristic of the received signal.

In this sense, when it is said that the signals A and B are quasi co-located (QCLed), it may mean that the signals A and B have went through a similar channel condition, and thus channel information estimated to detect the signal A is also useful to detect the signal B. Herein, the channel condition may be defined according to, for example, a Doppler shift, a Doppler spread, an average delay, a delay spread, a spatial reception parameter, or the like.

A 'TCI-State' parameter associates one or two downlink reference signals to corresponding QCL types (QCL types A, B, C, and D, see Table 4).

TABLE 4

| QCL Type | Description |
| --- | --- |
| QCL-TypeA | Doppler shift, Doppler spread, Average delay, Delay spread |
| QCL-TypeB | Doppler shift, Doppler spread' |
| QCL-TypeC | Doppler shift, Average delay |
| QCL-TypeD | Spatial Rx parameter |

Each 'TCI-State' may include a parameter for configuring a QCL relation between one or two downlink reference signals and a DM-RS port of a PDSCH (or PDCCH) or a CSI-RS port of a CSI-RS resource.

Meanwhile, for each DL BWP configured to a UE in one serving cell, the UE may be provided with 10 (or less) search space sets. For each search space set, the UE may be provided with at least one of the following information.

1) search space set index s (0≤s≤40), 2) an association between a CORESET p and the search space set s, 3) a PDCCH monitoring periodicity and a PDCCH monitoring offset (slot unit), 4) a PDCCH monitoring pattern within a slot (e.g., indicating a first symbol of a CORSET in a slot for PDCCH monitoring), 5) the number of slots in which the search space set s exists, 6) the number of PDCCH candidates per CCE aggregation level, 7) information indicating whether the search space set s is CSS or USS.

In the NR, a CORESET #0 may be configured by a PBCH (or a UE-dedicated signaling for handover or a PSCell configuration or a BWP configuration). A search space (SS) set #0 configured by the PBCH may have monitoring offsets (e.g., a slot offset, a symbol offset) different for each associated SSB. This may be required to minimize a search space occasion to be monitored by the UE. Alternatively, this may be required to provide a beam sweeping control/data region capable of performing control/data transmission based on each beam so that communication with the UE is persistently performed in a situation where a best beam of the UE changes dynamically.

Figure 9:
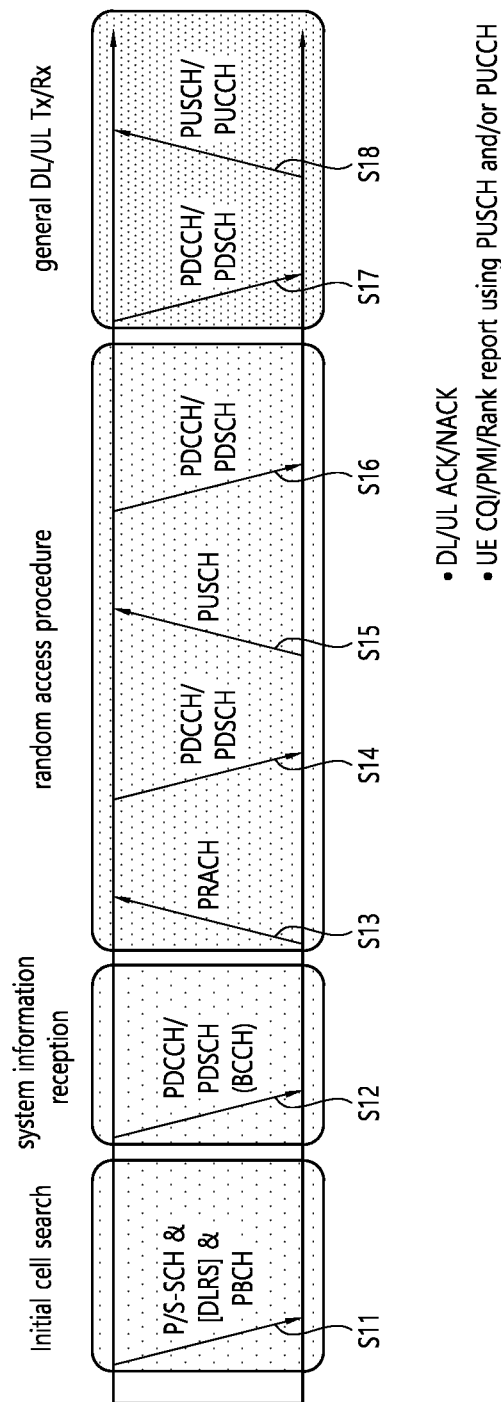
FIG. 9 illustrates physical channels and typical signal transmission.

FIG. 9 illustrates physical channels and typical signal transmission.

Referring to FIG. 9, in a wireless communication system, a UE receives information from a BS through a downlink (DL), and the UE transmits information to the BS through an uplink (UL). The information transmitted/received by the BS and the UE includes data and a variety of control information, and there are various physical channels according to a type/purpose of the information transmitted/received by the BS and the UE.

The UE which is powered on again in a power-off state or which newly enters a cell performs an initial cell search operation such as adjusting synchronization with the BS or the like (S11). To this end, the UE receives a primary synchronization channel (PSCH) and a secondary synchronization channel (SSCH) from the BS to adjust synchronization with the BS, and acquire information such as a cell identity (ID) or the like. In addition, the UE may receive a physical broadcast channel (PBCH) from the BS to acquire broadcasting information in the cell. In addition, the UE may receive a downlink reference signal (DL RS) in an initial cell search step to identify a downlink channel state.

Upon completing the initial cell search, the UE may receive a physical downlink control channel (PDCCH) and a physical downlink control channel (PDSCH) corresponding thereto to acquire more specific system information (S12).

Thereafter, the UE may perform a random access procedure to complete an access to the BS (S13~S16). Specifically, the UE may transmit a preamble through a physical random access channel (PRACH) (S13), and may receive a random access response (RAR) for the preamble through a PDCCH and a PDSCH corresponding thereto (S14). Thereafter, the UE may transmit a physical uplink shared channel (PUSCH) by using scheduling information in the RAR (S15), and may perform a contention resolution procedure similarly to the PDCCH and the PDSCH corresponding thereto (S16).

After performing the aforementioned procedure, the UE may perform PDCCH/PDSCH reception (S17) and PUSCH/physical uplink control channel (PUCCH) transmission (S18) as a typical uplink/downlink signal transmission procedure. Control information transmitted by the UE to the BS is referred to as uplink control information (UCI). The UCI includes hybrid automatic repeat and request (HARQ) acknowledgement (ACK)/negative-ACK (HACK), scheduling request (SR), channel state information (CSI), or the like. The CSI includes a channel quality indicator (CQI), a precoding matrix indicator (PMI), a rank indication (RI), or the like. In general, the UCI is transmitted through the PUCCH. However, when control information and data are to be transmitted simultaneously, the UCI may be transmitted through the PUSCH. In addition, the UE may aperiodically transmit the UCI through the PUSCH according to a request/instruction of a network.

In order to enable reasonable battery consumption when bandwidth adaptation (BA) is configured, only one uplink BWP and one downlink BWP or only one downlink/uplink BWP pair for each uplink carrier may be activated at once in an active serving cell, and all other BWPs configured in the UE are deactivated. In the deactivated BWPs, the UE does not monitor the PDCCH, and does not perform transmission on the PUCCH, PRACH, and UL-SCH.

For the BA, RX and TX bandwidths of the UE are not necessarily as wide as a bandwidth of a cell, and may be adjusted. That is, it may be commanded such that a width is changed (e.g., reduced for a period of low activity for power saving), a position in a frequency domain is moved (e.g., to increase scheduling flexibility), and a subcarrier spacing is changed (e.g., to allow different services). A subset of the entire cell bandwidth of a cell is referred to as a bandwidth part (BWP), and the BA is acquired by configuring BWP(s) to the UE and by notifying the UE about a currently active BWP among configured BWPs. When the BA is configured, the UE only needs to monitor the PDCCH on one active BWP. That is, there is no need to monitor the PDCCH on the entire downlink frequency of the cell. A BWP inactive timer (independent of the aforementioned DRX inactive timer) is used to switch an active BWP to a default BWP. That is, the timer restarts when PDCCH decoding is successful, and switching to the default BWP occurs when the timer expires.

Hereinafter, an integrated access and backhaul link (IAB) will be described. Meanwhile, hereinafter, for convenience of description, a proposed method will be described based on a new RAT (NR) system. However, the range of the system to which the proposed method is applied is expandable to other systems such as 3GPP LTE/LTE-A systems in addition to the NR system.

One of the potential technologies aimed at enabling future cellular network deployment scenarios and applications is support for wireless backhaul and relay links, and it enables flexible and highly dense deployment of NR cells without the need to proportionally densify the transport network.

It is expected that greater bandwidth in NR compared to LTE will be available (e.g., mmWave spectrum) with the native deployment of massive MIMO or multi-beam systems, thus, occasions are created for the development and deployment of integrated access and backhaul links. This makes it easier of a dense network of self-backhauled NR cells in a more integrated manner by establishing multiple control and data channels/procedures defined to provide access or access to the UEs. Such systems are referred to as integrated access and backhaul links (IAB).

The following terms may be used in the present disclosure.

AC (x): an access link between the node (x) and the UE(s).

BH (xy): a backhaul link between the node (x) and the node (y).

In this case, the node may mean a donor gNB (DgNB) or a relay node (RN). Here, the DgNB or the donor node may be a gNB that provides a function to support backhaul to IAB nodes.

In addition, in the present disclosure, for convenience of explanation, when relay node 1 and relay node 2 exist, relay node 1 which is connected to relay node 2 by a backhaul link and relaying data transmitted and received to relay node 2 is called a parent node of relay node 2, and relay node 2 is called a child node of relay node 1.

Figure 10:
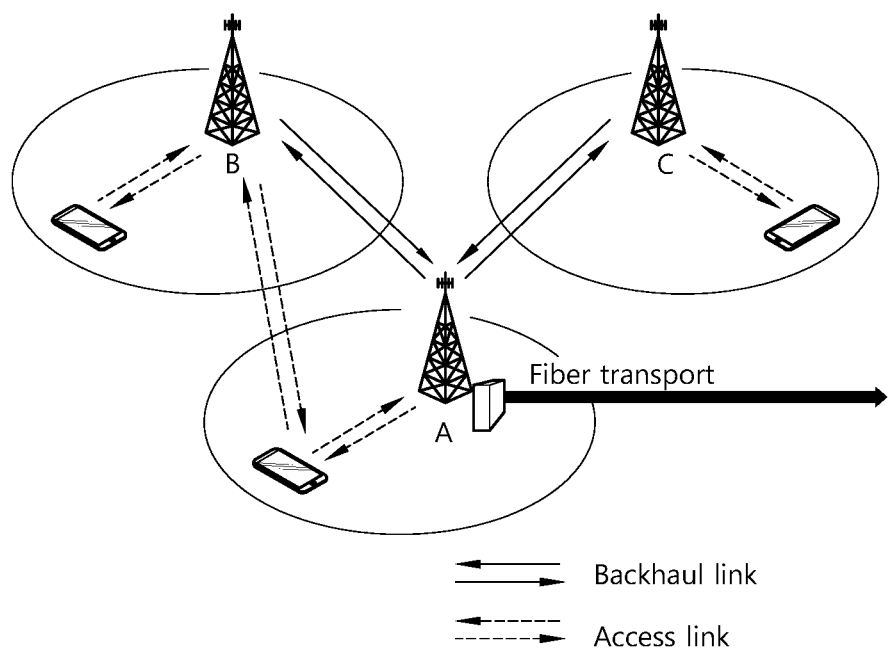
FIG. 10 schematically illustrates an example for a network with integrated access and backhaul links (IAB).

FIG. 10 schematically illustrates an example for a network with integrated access and backhaul links (IAB).

According to FIG. 10, relay nodes (for example, B, C. It may be referred to as a relay node) may multiplex access and backhaul links in the time, frequency, or space domain (i.e., beam-based operation).

The operation of different links may operate on the same frequency or on different frequencies (which may also be referred to as 'in-band' or 'out-band' relays, respectively). Efficient support of out-of-band relays may be important for some NR deployment scenarios. Close interworking with access links operating on the same frequency to accommodate duplex restrictions and avoid/mitigate interference is also very important.

Furthermore, operating the NR system in the millimeter wave spectrum may have problems such as severe short-term blocking that cannot be easily mitigated by the current RRC-based handover mechanism. Overcoming the short-term blocking in mmWave systems may require a fast RAN-based mechanism for switching between relay nodes that does not necessarily require the inclusion of a core network. It may also be necessary to develop an integrated framework that allows for fast switching of over-access and backhaul links. Over-the-air (OTA) coordination between relay nodes may also be considered to mitigate interference and support end-to-end path selection and optimization.

Addressing the following requirements in relation to IAB in NR may be necessary.

Efficient and flexible operation for in-band and out-of-band relaying in indoor and outdoor scenarios Multi-hop and redundant connections End-to-end path selection and optimization Support of backhaul links with high spectral efficiency Support of legacy NR UEs Legacy NR is designed to support half-duplex devices. Thus, half-duplex is supported and deserves to be targeted in the IAB scenario. Furthermore, IAB devices having a full duplex may also be considered.

In the IAB scenario, if each relay node (RN) does not have the scheduling capability, the donor gNB (DgNB) must schedule the entire links between the DgNB, related relay nodes and UEs. In other words, the DgNB should make a scheduling decision for all links by collecting traffic information from all related relay nodes, and then inform each relay node of the scheduling information.

On the other hand, distributed scheduling can be performed when each relay node has a scheduling capability. Then, immediate scheduling of the uplink scheduling request of the UE is possible, and the backhaul/access link can be used more flexibly by reflecting the surrounding traffic conditions.

Figure 11:
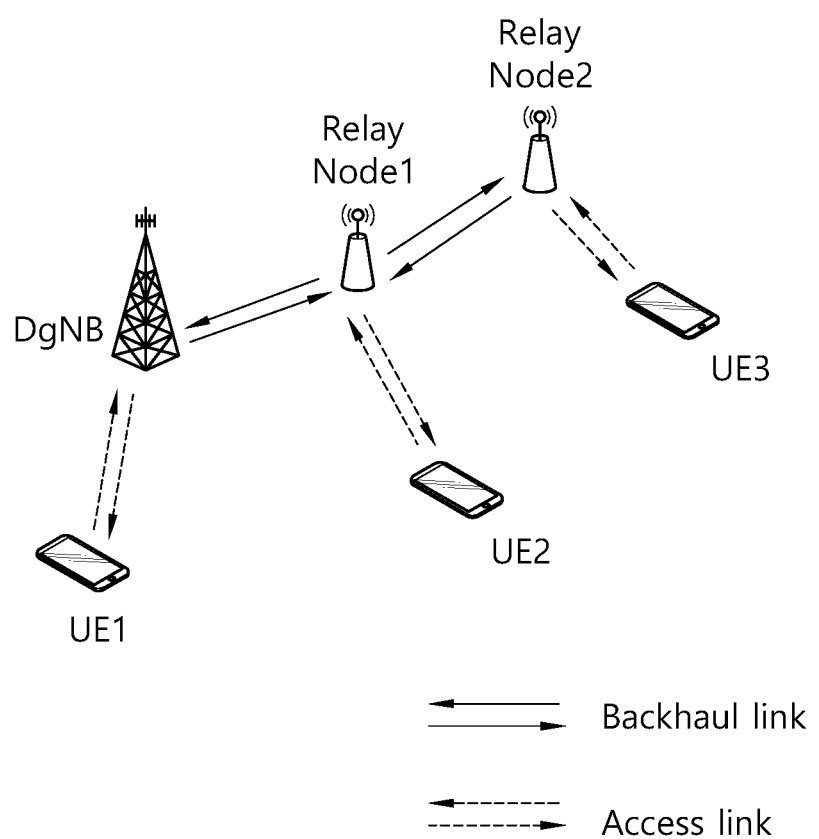
FIG. 11 schematically illustrates an example of the configuration of access and backhaul links.

FIG. 11 schematically illustrates an example of the configuration of access and backhaul links.

FIG. 11 illustrates an example in which a backhaul link and an access link are configured when DgNB and IAB relay nodes (RNs) exist. The DgNB, relay node 1, and relay node 2 are connected to a backhaul link, and UEs 1, 2, and 3 are sequentially connected to the DgNB, relay node 1, and relay node 2 through the access link.

The DgNB may make a scheduling decision of two backhaul links and three access links, and inform the scheduling results. Such centralized scheduling may include scheduling delays and cause latency issues.

If each relay node has a scheduling capability, distributed scheduling may be performed. Then, immediate scheduling of the uplink scheduling request of the UE can be performed, and the backhaul/access links can be used more flexibly by reflecting the surrounding traffic conditions.

Figure 12:
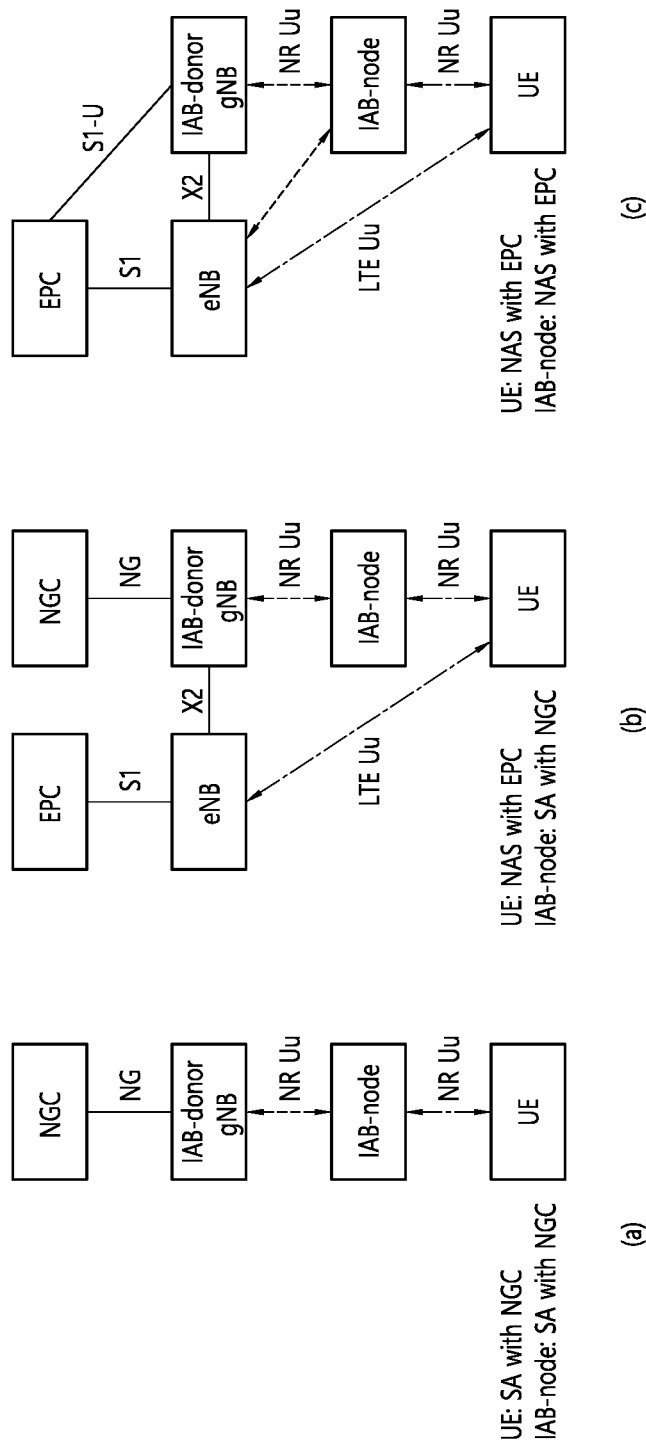
FIG. 12 illustrates the IAB node operating in stand alone (SA) mode or non-stand alone (NSA).

FIG. 12 illustrates that the IAB node operates in stand alone (SA) mode or non-stand alone (NSA).

(a) of FIG. 12 illustrates that both the UE and the IAB node operate in SA mode in relation to the NGC, (b) of FIG. 12 illustrates that the UE operates in the NSA mode in relation to the EPC while the IAB node operates in the SA mode in the relation with the NGC, and (c) of FIG. 12 illustrates that both the UE and the IAB node operate in the NSA mode in relation to the EPC.

That is, the IAB node may operate in SA mode or NSA mode. When operating in NSA mode, the IAB node uses only the NR link for backhauling. A UE connecting to the IAB node may select an operation mode different from that of the IAB node. The UE may additionally connect to a different type of core network than the connected IAB node. IAB nodes operating in NSA mode may be connected to the same or different eNBs. A UE operating in the NSA node may connect to the same or different eNB as the connected IAB node.

Figure 13:
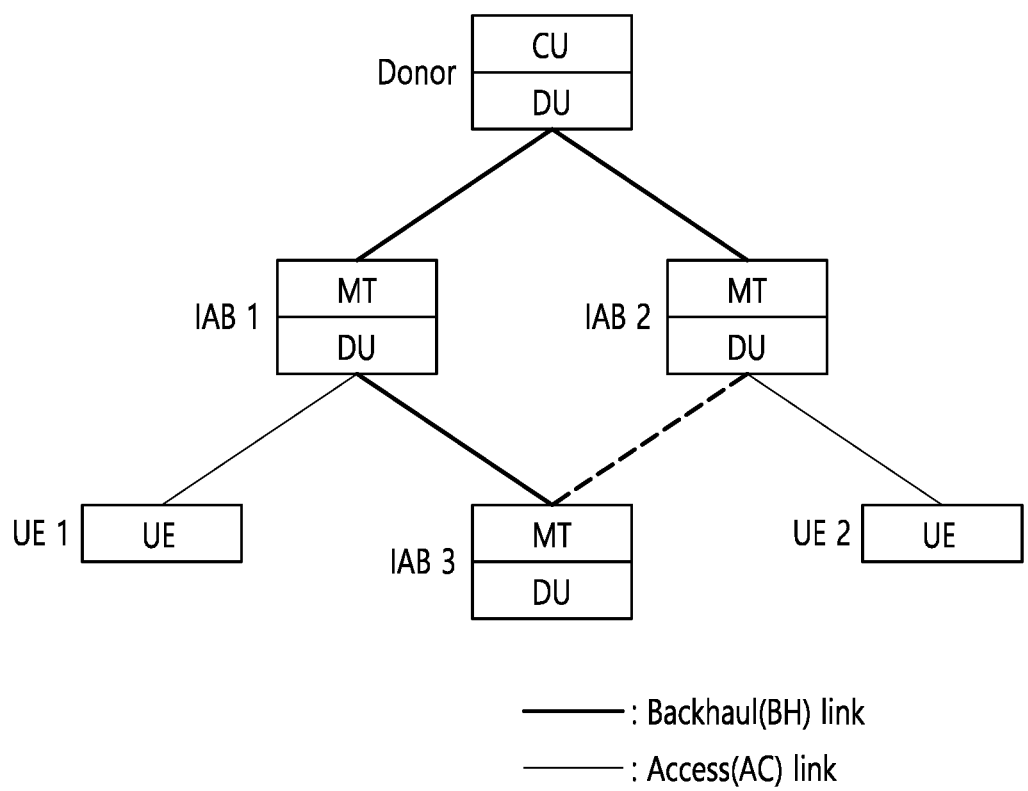
FIG. 13 illustrates a backhaul link and an access link.

FIG. 13 illustrates a backhaul link and an access link.

Referring to FIG. 13, a link between a donor node (which may be referred to as a parent node) and an IAB node or a link between IAB nodes is called a backhaul link. On the other hand, the link between the donor node and the UE or the link between the IAB node and the UE is called an access link. Specifically, the link between the MT of the IAB node and the DU of the parent node or the link between the DU of the IAB node and the MT of the child node of the IAB node is called a backhaul link, and the link between the DU of the IAB node and the UE may be referred to as an access link.

For communication with the parent node, the IAB node may be provided with an MT configuration indicating link direction information on a backhaul link between the parent node and itself. In addition, for communication with the child node, the IAB node may be provided with a DU configuration that informs the link direction for an access link between the child node/access UE and itself and link availability information.

In the existing IAB node, the DU and the MT performed TDM operation which is to operate through different time resources. On the other hand, in a future communication system, it may be required to perform resource multiplexing such as SDM/FDM and full duplexing (FD) between DUs and MTs for efficient resource management.

Figure 14:
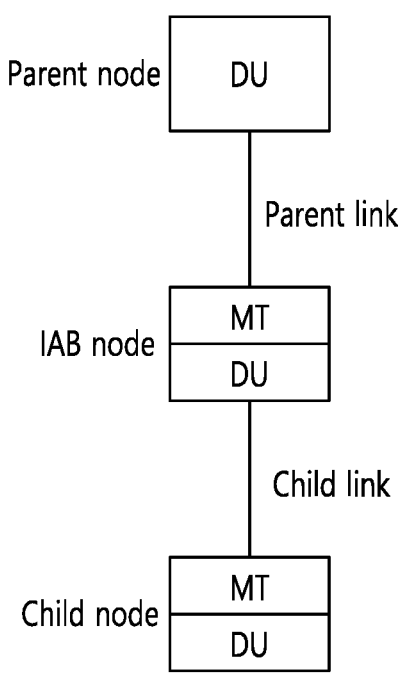
FIG. 14 illustrates a parent link and a child link.

FIG. 14 illustrates a parent link and a child link.

Referring to FIG. 14, a link between an IAB node (specifically, IAB MT) and a parent node (specifically, parent DU) is referred to as a parent link, and a link between an IAB node (specifically, IAB DU) and a child node (specifically, child MT) is called a child link. The parent link may be the above-mentioned backhaul link, and the child link may be a backhaul link or an access link depending on what the child node is. That is, if the child node is an IAB node, it may be a backhaul link, and if the child node is a UE, it may be an access link. TDM operation between parent link and child link has been previously discussed, and SDM/FDM and FD operation are currently being discussed.

From the point of view of the DU of the IAB node, there are multiple types of time resources for the child link, such as downlink (D), uplink (U), and flexible (F).

Each downlink, uplink and flexible time resource may be a hard, soft, or unavailable (not-available: NA) resource. Here, the unavailable resource means that the resource is not used for communication of the DU child link. Hard resources means that they are always available for communication on the DU child link. Whether soft resources can be used for communication in the DU child link (availability) may be explicitly and/or implicitly controlled by the parent node. This will be described later in more detail.

A configuration for a link (resource) direction (DL/UL/F) and link (resource) availability (Hard/Soft/NA) of a time resource for a DU child link may be referred to as a 'DU configuration'. DU configuration can be used for effective multiplexing and interference handling between IAB nodes. For example, the above configuration may be used to indicate for which link a time resource is valid for a parent link and a child link. It can also be used to coordinate interference between child nodes. Considering this aspect, the DU configuration may be more effective when configured semi-statically and configured specifically for an IAB node.

The availability of soft resources can be dynamically configured through physical layer (L1)-based implicit/explicit signals. Hereinafter, "IA" may mean that the DU resource is explicitly or implicitly indicated as available, and "INA" may mean that the DU resource is explicitly or implicitly indicated that it is unavailable. Dynamic L1-based signaling may indicate whether the DU soft resource is "IA" or "INA".

From a DU perspective, a soft resource may be in an IA (indicated as available) state or a non-IA state. In this case, the non-IA state may be interpreted as an INA (indicated as not available) state. Whether the soft resource is IA may be indicated through AI (availability indicator) information, and the AI information may be indicated from the parent node to the IAB node through AI-DCI. The following DCI format 2_5 is an example of AI-DCI.

<DCI Format 2_5>

DCI format 2_5 is a DCI format used to inform the availability of soft resources. The following information may be transmitted through DCI format 2_5 together with CRC scrambled by AI-RNTI.

Availability indicator 1, availability indicator 2, . . . , availability indicator N.

The size of DCI format 2_5 with CRC scrambled by AI-RNTI may be configured by a higher layer up to 128 bits.

Similar to the SFI (slot format indication) configuration for the access link, the IAB node MT may have three types of time resources for the parent link: downlink (D), uplink (U), and flexible (F).

DU and MT existing in the same IAB node (or co-located) may not operate at the same time and may operate in TDM, for some reason such as intra-node interference, slot/symbol boundary misalignment, power sharing, etc.

On the other hand, SDM/FDM multiplexing may be used between the DU and the MT. For example, it is applicable when the DU and the MT use different panels and there is little interference effect between the panels. In this case, the DU and the MT that exist in the same IAB node (or are co-located) can transmit (DU transmit, MT transmit) or receive (DU receive, MT receive) at the same time. (It is impossible for DU and MT to simultaneously perform transmission and reception (DU transmission, MT reception) or reception and transmission (DU reception, MT transmission), respectively).

Alternatively, full duplexing (FD) may be used between the DU and the MT. For example, it is applicable to a case where there is little interference effect between the DU and the MT, such as a case in which the frequency region in which the DU operates and the frequency region in which the MT operates are far apart. In this case, the DU and the MT that exist in the same IAB node (or are co-located) can freely transmit and receive at the same time. The DU and the MT can transmit or receive at the same time, and it is also possible for the DU and the MT to simultaneously perform transmission and reception or reception and transmission, respectively.

The MT and DU of the IAB node may be configured with a plurality of component carriers (CCs) (meaning that a plurality of CCs are used). In this case, different CCs may operate in the same or different frequency regions or may use the same or different panels.

There may be N (N is a natural number) MT-CCs and M (M is a natural number) DU cells in the IAB node.

Figure 15:
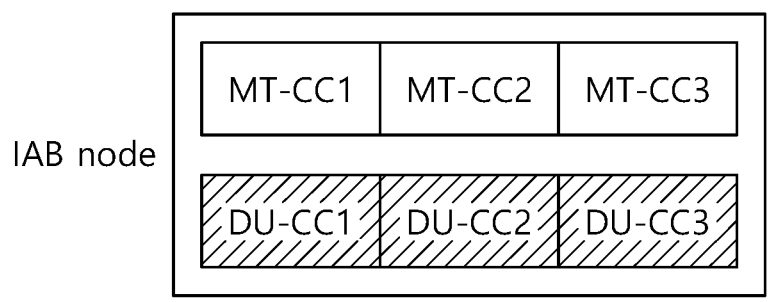
FIG. 15 shows an example in which an IAB node is configured with N=3 MT-CCs and M=3 DU cells.

FIG. 15 shows an example in which an IAB node is configured with N=3 MT-CCs and M=3 DU cells. MT-CCs in the IAB node may operate through the same or different frequency resources, and one MT-CC may be connected to one or a plurality of parent DU cells. DU cells in the IAB node may operate through the same or different frequency resources.

For a specific MT-CC/DU cell pair in the IAB node, the MT-CC and the DU cell may have a TDM or no-TDM relationship for the following four Tx/Rx direction combinations, and TDM/no-TDM may be different for each Tx/Rx combination.

i) DU-Tx/MT-Tx, ii) DU-Rx/MT-Rx, iii) DU-Tx/MT-Rx, iv) DU-Rx/MT-Tx

For example, for a specific MT-CC/DU cell pair, all four Tx/Rx combinations may operate in TDM. In this case, the DU cell and the MT-CC shall always operate in TDM regardless of the Tx/Rx direction of the DU cell and the MT-CC. As another example, for a specific MT-CC/DU cell pair, all of the four Tx/Rx combinations may operate in no-TDM. In this case, regardless of the Tx/Rx directions of the DU cell and the MT-CC, the DU cell and the MT-CC can always operate simultaneously (simultaneous) in no-TDM. As another example, for a specific MT-CC/DU cell pair, for DU-Tx/MT-Tx and DU-Rx/MT-Rx, it operates in no-TDM, and TDM may be used for DU-Tx/MT-Rx and DU-Rx/MT-Tx. This is to use a method (e.g., SDM/FDM) that enables simultaneous operation when the directions of Tx/Rx of the DU cell and the MT-CC are the same, when the DU cell and the MT-CC have the same Tx/Rx direction, they may operate simultaneously. TDM/no-TDM information for each Tx/Rx combination may be configured/determined differently/independently for each specific MT-CC/DU cell pair in the IAB node.

In this case, the IAB MT may be connected to two parent DUs using, for example, a dual-connectivity scheme or a DAPS-HO scheme.

The Tx/Rx timing alignment method of the IAB node that can be considered in the IAB environment may be as follows.

Case 1: Alignment of DL transmission timing between IAB node and IAB donor.

Case 2: DL and UL transmission timings are aligned within the IAB node.

Case 3: DL and UL reception timings are aligned within the IAB node.

Case 4: Within the IAB node, use case 2 for transmission and case 3 for reception.

Case 5: In different time slots within the IAB node, use case 1 for access link timing and case 4 for backhaul link timing.

Case 6: Using the DL transmission timing of case 1 and the UL transmission timing of case 2.

Case 7: Using the DL transmission timing of case 1 and the UL transmission timing of case 3.

Hereinafter, some cases among the timing alignment cases will be described in more detail.

Timing Alignment Case 1 (Hereinafter May be Abbreviated as Case 1).

In case 1, DL transmission (Tx) timing is aligned between an IAB node and an IAB donor (represented by a CU). That is, the DL Tx timing of DUs between IAB nodes is aligned, and this is a timing alignment method used by the Rel-16 IAB node.

Timing Alignment Case 6 (Hereinafter May be Abbreviated as Case 6)

Case 6 is a case in which DL transmission timings for all IAB nodes coincide with parent IAB node (CU) or donor DL timings. The UL transmission timing of the IAB node may be aligned with the DL transmission timing of the IAB node. That is, the MT UL Tx timing and the DU DL Tx timing of the IAB node are aligned.

Timing Alignment Case 7.

In case 7, DL transmission timings for all IAB nodes coincide with parent IAB node or donor DL timings. The UL reception timing of the IAB node may coincide with the DL reception timing of the IAB node. If the DL Tx and UL Rx are not well aligned in the parent node, additional information about alignment may be required for the child node to properly set the DL Tx timing. Case 7 is a scheme in which the MT DL Rx timing of the IAB node and the DU UL Rx timing are aligned.

The transmission/reception timing from the MT perspective is the same as that of the existing IAB node (Rel-16 IAB node), and the UL Rx timing of the DU may be aligned with the DL Rx timing of the MT. The IAB node needs to adjust the TA of the child MTs so that the child MTs transmit UL signals according to IAB node's UL Rx timing.

This timing alignment method may not reveal a difference in the standard operation of the IAB node compared to the existing timing alignment method (Case 1). Accordingly, the timing alignment case 7 may be replaced/interpreted as the timing alignment case 1.

In the present disclosure, timing alignment may mean slot-level alignment or symbol-level alignment.

Hereinafter, DAPS-HO (Dual active protocol stack based handover) will be described.

The DAPS handover (hereinafter may be abbreviated as DAPS) may be referred to as a handover procedure for maintaining a connection to the source gNB until the source cell (source gNB) is released after receiving the RRC message (HO Command) for handover and successful random access to the target cell (target gNB).

From the functional point of view of the UE, the DAPS may generally have the following characteristics.

In terms of transmission operation, 1) a common sequence number (SN), 2) separate header compression for the source cell and the target cell, 3) separate ciphering for the source cell and the target cell.

In terms of reception operation, 1) separate deciphering for source cell and target cell, 2) separate header decompression for source cell and target cell, 3) common PDCP reordering, 4) In-sequence delivery and duplication detection, 5) Common buffer management.

In general, the network and the UE have the same process and function for both transmission and reception operations. The difference may be whether these functions are co-located. In the network, all functions except DL PDCP SN allocation and UL PDCP reordering are separately deployed and not performed by the source eNB or the target eNB. Accordingly, it is assumed that two PDCP entities are located in the source eNB and the target eNB, respectively.

On the UE side, all functions including SN allocation and PDCP reordering are deployed together. Accordingly, all functions for DAPS can be modeled as a single PDCP entity in the UE side. For single UL data transmission, only header compression and security processing for the source eNB or target eNB may be used.

RF/Baseband Requirements of the UE.

In order to minimize interruption, regardless of whether the UE is SAPS or DAPS, it may be necessary to continue data transmission/reception with the source cell when performing a random access procedure for the target cell. This is possible only when the UE supports simultaneous transmission and reception with two cells. In most cases, it works on UEs with dual Rx/dual Tx chains. In the case of a UE with a dual Rx/single Tx RF chain or a single Rx/single Tx RF chain, more restrictions may be applied. In addition, it may be necessary to divide the capabilities of the UE for effective use of baseband and RF resources. Since tuning of the baseband and RF resources of the UE is not so simple in the case of SAPS, additional interruption and complexity of the UE may occur.

For UEs with dual Rx/single Tx RF chains, to support simultaneous UL data transmission to a source eNB and UL RACH transmission to a target eNB, if some requirements can be met (e.g., if the bandwidth of the source cell is greater than the bandwidth of the target cell, and the Tx power difference for the two cells is within a certain limit), simultaneous transmission may be supported.

Otherwise, some kind of UL TDM pattern is needed, which may add additional interruption time and UL switching complexity. But this UE option provides flexibility of different UE implementation flavors in terms of hardware and power efficiency (especially for low tier devices, UEs which are not capable of UL CA and/or UL MIMO).

For UEs with Single Rx/Single Tx RF chains, if some requirements can be met, e.g. the bandwidth of the source cell is larger than that of the target cell, Tx/Rx power difference for the two cells is in a certain limit, the simultaneous transmission/reception can still be supported. Otherwise TDM design is required for both DL and UL, which adds additional complexity at both UE and network side. Furthermore, RF chain switching is required for both DL and UL, which will increase the HO interruption time and switching complexity.

If a UE indicates a capability for dual active protocol stack based handover (DAPS HO), the UE can be provided with a source MCG and a target MCG. The UE may determine the transmission power of the MCG and the transmission power of the SCG for each frequency range.

UE transmission may overlap in the target cell and the source cell. For example, 1) when carrier frequencies for target MCG and source MCG are intra-frequency and intra-band, and time resources overlap, 2) when carrier frequencies for target MCG and source MCG are not in frequency and in band, UE transmission may overlap in overlapping time resources and overlapping frequency resources.

In the case of intra-frequency DAPS HO operation, the UE can expect that the activated DL BWP and activated UL BWP of the target cell are in the activated DL BWP and activated UL BWP of the source cell, respectively.

The UE may provide the ability to monitor the maximum number of PDCCH candidates per slot for the target MCG and the ability to monitor the maximum number of PDCCH candidates per slot for the source MCG.

For PRACH transmission, an IAB-node MT determines frames and subframes within the frames containing PRACH occasions. The IAB-node MT determines an association period for mapping SS/PBCH blocks to PRACH occasions based on a PRACH configuration period according to below table. An association pattern period includes one or more association periods and is determined so that a pattern between PRACH occasions and SS/PBCH blocks repeats at most every 640 msec. A PRACH occasion in a PRACH slot may be valid or invalid according to the conditions.

The following table illustrates the mapping between the PRACH configuration period for the MT of the IAB node and the SS/PBCH block.

TABLE 5

| PRACH configuration period (msec) | Association period, number of PRACH configuration periods |
| --- | --- |
| 10 | {1, 2, 4, 8, 16, 32, 64} |
| 20 | {1, 2, 4, 8, 16, 32} |
| 40 | {1, 2, 4, 8, 16} |
| 80 | {1, 2, 4, 8} |
| 160 | {1, 2, 4} |
| 320 | {1, 2} |
| 640 | {1} |

If an IAB-node is provided a value $T_{delta}$ from a serving cell, the IAB-node may assume that $(N_{TA}+N_{TA,offset}) \cdot T_c/2 + T_{delta}$ is a time difference between a DU transmission of a signal from the serving cell and a reception of the signal by the IAB-node MT when $(N_{TA}+N_{TA,offset}) T_c/2+T_{delta}>0$. The IAB-node may use the time difference to determine a DU transmission time.

The present disclosure will now be described. In this disclosure, consider a situation in which a specific IAB node is connected to a plurality of parent nodes and receives an indication from the parent node whether to use MT and DU for soft resources in the IAB node through AI (availability indication)-DCI (downlink control information). In this case, since the IAB node receives information from a plurality of parent nodes, it may be difficult to determine the resource distribution of the MT and the DU due to a conflict or lack of received information. In this case, we propose a method for solving the resource distribution problem of MT and DU in the IAB node.

Figure 16:
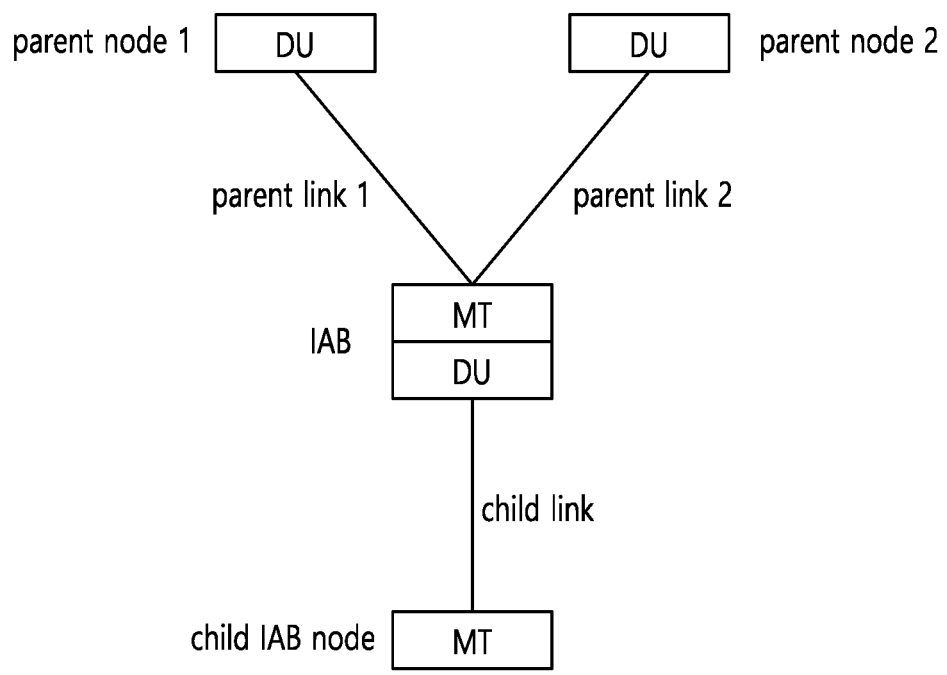
FIG. 16 shows an example in which the IAB node is connected to the parent node 1 and the parent node 2.

FIG. 16 shows an example in which the IAB node is connected to the parent node 1 and the parent node 2.

Referring to FIG. 16, the MT in the IAB node (i.e., the IAB MT) is connected to the DU in the parent node 1 (i.e., the parent DU1) and the DU in the parent node 2 (i.e., the parent DU2).

The link between the parent DU1 and the IAB MT is referred to as parent link 1, and the link between the parent DU2 and the IAB MT is referred to as parent link 2.

A link between a DU (i.e., IAB DU) in an IAB node and a child IAB node and/or an access UE is referred to as a child link.

Parent link 1 and parent link 2 may be connected through the same or different MT-CCs in the IAB MT.

Parent link 1 and child link can operate using different time resources with TDM.

Among the MT-CCs of the IAB node, the MT-CC(s) connected to the parent node 1 is referred to as CG1, the MT-CC(s) connected to the parent node 2 is referred to as CG2, and the MT-CC(s) connected to the parent node x is referred to as CGx. Alternatively, DU cells in parent node 1 connected to the IAB node are referred to as CG1, DU cells in parent node 2 are referred to as CG2, and DU cells in parent node x are referred to as CGx.

In the context of the present disclosure, MT may mean an MT-CC, and DU may mean a DU cell.

One IAB node may have a plurality of parent nodes (that is, it may be connected to a plurality of parent nodes). The plurality of connected parent nodes are connected to each other directly, by a single-hop, or by multi-hop wireless backhaul, so that real-time cooperation between parent nodes may not be possible. In this case, a plurality of parent nodes may be connected to the same MT or different MTs of the IAB node. Each parent node can give AI instructions to child nodes.

The DU in the IAB node determines its operable resource according to the H/S/NA set by the CU. For example, if the H/S/NA set by the CU is H (hard), the resource can be used by the DU. In case of NA, DU is not used. In case of S (soft), it is used by DU depending on whether AI is instructed. When an AI instruction is received from the parent node through DCI (AI-DCI), the DU can be operated, otherwise the operation is not possible. The MT determines the operable resource in consideration of the H/S/NA of the DU in the TDM relationship with the MT.

In the present disclosure, the case of available resource determination in soft resources is considered. From the point of view of the DU in the IAB node, when MT which is in a TDM relationship with DU is connected to a plurality of parent nodes, for example, when two CGs are assumed, there may be a case where both CG1 and CG2 include a MT which is in a TDM relationship with the DU.

In addition, when a plurality of MTs connected to the parent node exist and AI-DCI is monitored by the plurality of MTs, AI information may be transmitted to any MT that monitors the AI-DCI. In other words, AI-DCI may be transmitted through any MT that performs AI-DCI monitoring in CG.

To determine the operation of the DU and MT in the soft resource of the DU, all of the AI (Availability indicator, Availability indication) information transmitted from a plurality of parent nodes may be considered. For example, when two CGs are assumed, it is necessary to consider both the AI information received from CG1 and the AI information received from CG2. However, since dynamic information exchange between CGs is impossible, collisions between received AI information may occur. Therefore, the present disclosure proposes a method in which an IAB node having multiple parent nodes acquires AI information on a soft resource and determines the operations of DUs and MTs.

First, an integrated access-backhaul (IAB) operation will be described. The IAB node may include IAB-DU (hereinafter simply DU) and IAB-MT (hereinafter simply MT) as described above.

A slot format for an IAB-node DU or an IAB-node MT includes downlink symbols, uplink symbols, and flexible symbols.

For each serving cell of the DU of the IAB node, the DU of the IAB node may be provided with 'IAB-DU-Resource-Configuration'. 'IAB-DU-Resource-Configuration' may provide an indication of a slot format over a number of slots.

If the IAB-node MT is provided 'tdd-UL-DL-ConfigDedicated-IAB-MT', the parameter 'tdd-UL-DL-ConfigDedicated-IAB-MT' overrides only flexible symbols over the number of slots as provided by 'TDD-UL-DL-ConfigurationCommon'.

'tdd-UL-DL-ConfigDedicated-IAB-MT' may provide the following information.

1) Slot configuration set by 'slotSpecificConfigurationsToAddModList-IAB-MT', 2) For each slot configuration in the slot configuration set, the slot index for the slot provided by 'slotIndex', for the symbol sets for the slot by 'symbols', if 'symbol' is 'allDownlink', all symbols in the slot are downlink, if 'symbols' is 'allUplink', all symbols in the slot are uplink, and if 'symbol' is 'explicit', 'nrofDownlinkSymbols' provides a number of downlink first symbols in the slot and 'nrofUplinkSymbols' provides a number of uplink last symbols in the slot. If 'nrofDownlinkSymbols' is not provided, it may mean that there are no downlink first symbols in the slot, and if 'nrofUplinkSymbols' is not provided, it may mean that there are no uplink last symbols in the slot. The remaining symbols in the slot are flexible symbols.

if 'symbols' is 'explicit-IAB-MT', 'nrofUplinkSymbols' provides a number of uplink first symbols in the slot and 'nrofDownlinkSymbols' provides a number of downlink last symbols in the slot. If 'nrofUplinkSymbols' is not provided, it may means that there are no uplink first symbols in the slot and if 'nrofDownlinkSymbols' is not provided, it may means that there are no downlink last symbols in the slot. The remaining symbols in the slot are flexible.

The slot format for the DU of the IAB node or the MT of the IAB node may include a downlink symbol, an uplink symbol, and a flexible symbol. The slot format information may refer to information indicating whether each symbol is a downlink symbol, an uplink symbol, and a flexible symbol.

For each slot having the corresponding index provided by 'slotIndex', the MT of the IAB node may apply the format provided by the corresponding 'symbols'. The MT of the IAB node is provided with a list of slot format combinations applicable to one serving cell by 'SlotFormatCombinationsPerCell-IAB-MT', a configuration for monitoring DCI format 2_0 indicating a slot format combination may be provided by 'SlotFormatIndicator-IAB-MT'. The SFI field of DCI format 2_0 may indicate one slot format to the MT of the IAB node among the slot formats of the following table.

The following table illustrates the slot format in the normal CP.

TABLE 6

| Slot Format | \multicolumn{14}{c}{Symbol number in a slot} | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 56 | U | U | U | U | U | U | U | U | U | U | U | U | U | F |
| 57 | U | U | U | U | U | U | U | U | U | U | U | U | F | F |
| 58 | U | U | U | U | U | U | U | U | U | U | U | F | F | F |
| 59 | U | U | U | U | U | U | U | U | U | U | F | F | F | F |
| 60 | U | U | U | U | U | U | U | U | U | F | F | F | F | F |
| 61 | U | U | U | U | U | U | U | U | F | F | F | F | F | F |
| 62 | U | U | U | U | U | U | U | F | F | F | F | F | F | F |
| 63 | U | U | U | U | U | U | F | F | F | F | F | F | F | F |
| 64 | U | U | U | U | U | F | F | F | F | F | F | F | F | F |
| 65 | U | U | U | U | F | F | F | F | F | F | F | F | F | F |
| 66 | U | U | U | F | F | F | F | F | F | F | F | F | F | F |
| 67 | U | U | F | F | F | F | F | F | F | F | F | F | F | F |
| 68 | U | F | F | F | F | F | F | F | F | F | F | F | F | F |
| 69 | U | F | F | F | F | F | F | F | F | F | F | F | F | D |
| 70 | U | U | F | F | F | F | F | F | F | F | F | F | F | D |
| 71 | U | U | U | F | F | F | F | F | F | F | F | F | F | D |
| 72 | U | F | F | F | F | F | F | F | F | F | F | F | D | D |
| 73 | U | U | F | F | F | F | F | F | F | F | F | F | D | D |
| 74 | U | U | U | F | F | F | F | F | F | F | F | F | D | D |
| 75 | U | F | F | F | F | F | F | F | F | F | F | D | D | D |
| 76 | U | U | F | F | F | F | F | F | F | F | F | D | D | D |
| 77 | U | U | U | F | F | F | F | F | F | F | F | D | D | D |
| 78 | U | U | U | U | U | U | U | U | U | U | U | U | F | D |
| 79 | U | U | U | U | U | U | U | U | U | U | U | F | F | D |
| 80 | U | U | U | U | U | U | U | U | U | U | F | F | F | D |
| 81 | U | U | U | U | U | U | U | U | U | U | F | F | D | D |
| 82 | U | U | U | U | U | U | U | U | U | F | F | F | D | D |
| 83 | U | U | U | U | U | U | U | U | F | F | F | F | D | D |
| 84 | U | F | D | D | D | D | D | D | D | D | D | D | D | D |
| 85 | U | U | F | D | D | D | D | D | D | D | D | D | D | D |
| 86 | U | U | U | F | D | D | D | D | D | D | D | D | D | D |
| 87 | U | F | F | D | D | D | D | D | D | D | D | D | D | D |
| 88 | U | U | F | F | D | D | D | D | D | D | D | D | D | D |
| 89 | U | U | U | F | D | D | D | D | D | D | D | D | D | D |
| 90 | U | F | F | F | D | D | D | D | D | D | D | D | D | D |
| 91 | U | U | F | F | F | D | D | D | D | D | D | D | D | D |
| 92 | U | U | U | F | F | F | D | D | D | D | D | D | D | D |
| 93 | U | U | U | U | U | U | U | U | F | F | F | F | F | D |
| 94 | U | U | U | U | U | U | F | F | F | F | F | F | D | D |
| 95 | U | U | U | U | U | U | F | F | D | D | D | D | D | D |
| 96 | U | U | U | U | U | U | U | D | D | D | D | D | D | D |

The MT of the IAB node may be provided with a number or the number of symbols not used by the MT of the IAB node by 'guard-SymbolsProvided'. In the symbols, the IAB node may perform a transition between the MT and the DU. The SCS configuration for the number of symbols may be provided by 'guardSymbol-SCS'.

A symbol in the slot of the DU serving cell of the IAB node may be configured as a hard, soft, or unavailable type. When the downlink, uplink, or flexible symbol is configured as hard, the DU serving cell of the IAB node can respectively transmit, receive, or 'transmit or receive' operation on the corresponding symbol.

If the downlink, uplink, or flexible symbol is configured as soft, the DU of the IAB node (DU serving cell) can respectively transmit, receive, or 'transmit or receive' operations on the corresponding symbol only in the following cases.

1) For the IAB-node MT, a case in which ability to transmit or receive by the IAB-node DU in the soft symbol is equivalent to a configuration of the soft symbol as unavailable, 2) a case in which the IAB-node DU detects a DCI format 2_5 with an AI index field value indicating the soft symbol as available for transmission or reception.

That is, when a downlink, uplink, or flexible symbol is configured as soft, the IAB-node DU can respectively transmit, receive or either transmit or receive in the symbol only if:

1) If the MT of the IAB node does not transmit or receive in the corresponding symbol, 2) When the MT of the IAB node transmits/receives in the corresponding symbol, and the transmission/reception of the corresponding symbol by the MT of the IAB node is not changed due to the use of the corresponding symbol by the DU of the IAB node, 3) a case in which the MT of the IAB node detects DCI format 2_5 having an AI index field value indicating available soft symbols, and the like.

If the symbol is configured as unavailable, the DU of the IAB node does not transmit or receive in the symbol.

Figure 17:
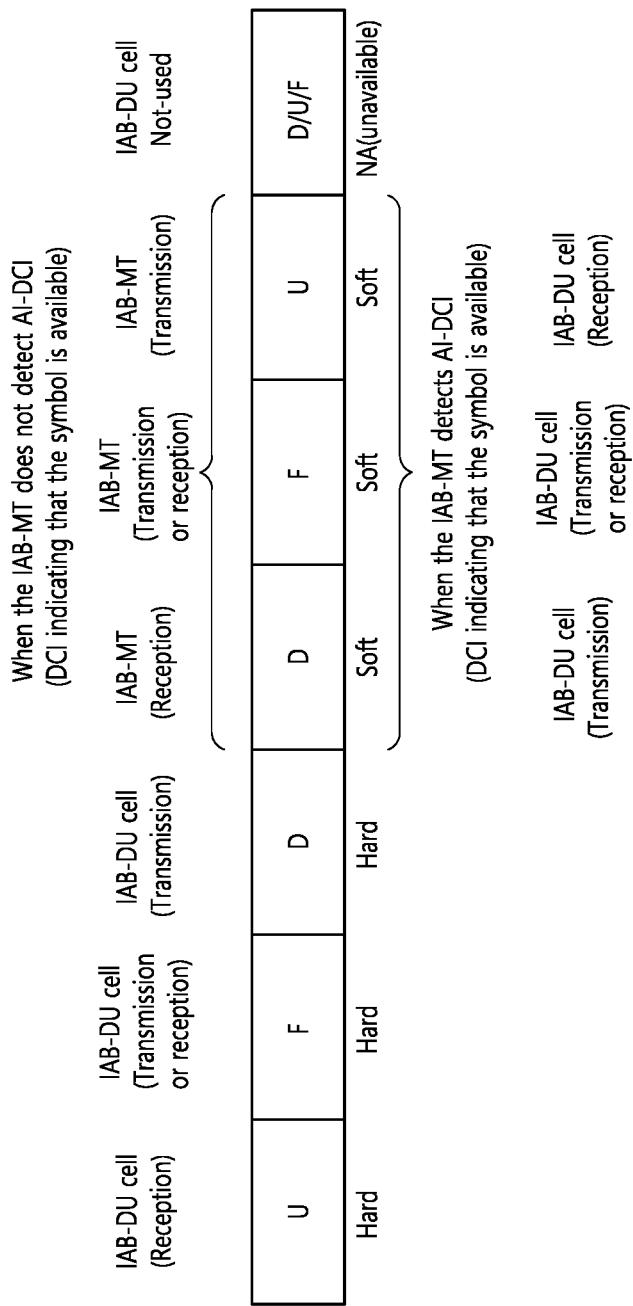
FIG. 17 illustrates the operation of the IAB node in each resource.

FIG. 17 illustrates the operation of the IAB node in each resource.

Referring to FIG. 17, each resource may be a symbol, and each symbol may be set to one of U (uplink), D (downlink), and F (flexible). In addition, each symbol may be set to one of hard, soft, and unavailable.

That is, a resource set to any one of U, D, and F may be set to any one of hard/soft/not available (unavailable).

In this case, when the uplink (U), flexible (F), or downlink (D) symbols is configured as hard, the DU serving cell of the IAB node can respectively receive, 'either transmit or receive', and transmit in a corresponding symbol.

When the downlink (D), flexible (F), or uplink (U) symbol is configured as soft, i) if the MT of the IAB node does not detect AI-DCI (i.e., DCI indicating that the corresponding symbol is available, DCI format 2_5), preferentially, the MT of the IAB node can respectively receive, 'transmit or receive', and transmit. ii) When the MT of the IAB node detects AI-DCI (i.e., DCI indicating that the corresponding symbol is available, DCI format 2_5), preferentially, the DU of the IAB node can respectively transmit, 'transmit or receive', and receive in the corresponding symbol.

If the D/U/F symbol is configured as unavailable, the DU of the IAB node does not transmit or receive in the symbol.

When a DU of an IAB node transmits an SS/PBCH block or periodic CSI-RS in a symbol of a slot or receives a PRACH or SR in a symbol, the symbol is equivalent to being configured as hard.

Information on AI-RNTI and information on the payload size of DCI format 2_5 may be provided to the IAB node. In addition, a search space set configuration for monitoring the PDCCH may also be provided.

The following information may be provided to the DU of the IAB node. 1) ID of DU serving cell of IAB node, 2) location of availability indication (AI) index field within DCI format 2_5, 3) availability combination set. Each availability combination within a set of availability combinations may contain the following information: i) information indicating the availability of soft symbols in one or more slots for the DU serving cell of the IAB node, ii) information related to mapping between the corresponding AI index field value of DCI format 2_5 and the soft symbol availability combination.

The random access preamble may be transmitted only in a time resource provided by a higher layer parameter (prach-ConfigurationIndex), and may be configured differently depending on FR1 or FR2, spectrum type.

Hereinafter, the content is described assuming a plurality of parent nodes, but may be applied to a single parent node. In addition, although the present disclosure is described assuming an environment in which the DU and the MT in the IAB node are in a TDM relationship, it can also be applied in an environment in which the DU and the MT are in a no-TDM relationship. In addition, although the present disclosure is described assuming two parent node environments, it may also be applied to a plurality (e.g., three or more) parent node environments.

The MT and DU of the IAB node may determine whether to use the soft resource by receiving the AI-DCI from the parent node (=parent IAB node). Therefore, in the IAB node having a plurality of parent nodes, AI-DCI can be set from the plurality of parent nodes and the parent nodes may not know each other's AI-DCI configuration information for the IAB node. Therefore, each parent node may not be able to determine whether the DU or the MT of the IAB node uses the corresponding resource for the soft resource.

The present disclosure considers the operation of the IAB node and the parent node in such an environment. In this case, two major scenarios can be assumed. That is, i) a case where an IAB node with multiple parent nodes monitors only AI-DCI from a single (i.e., one) parent node, and ii) a case of monitoring AI-DCIS from a plurality of parent nodes can be assumed, in turn, they are referred to as scenario 1 and scenario 2, respectively.

Scenario 1: IAB node can monitor AI-DCI to be received from a single parent node. That is, when the IAB node has a plurality of parent nodes, AI-DCI can be monitored only for a single parent node. For example, when the IAB node is connected to two parent nodes (parent node #1, parent node #2), AI-DCI is monitored for only one parent node, that is, only one parent node among parent node #1 and parent node #2 (that is, transmitted by any one parent node). The IAB node may be restricted, for example, to monitor only the AI-DCI of a single parent node.

The IAB node can only monitor AI-DCI from a preagreed (/configured/signaled) parent node. Here, a preagreed (/configured/signaled) parent node is configurable, and at least one of the following may be considered as a method of determining the parent node.

Alt 1. When an IAB node is connected to a plurality of parent nodes by dual connectivity (DC), the IAB node can monitor only the AI-DCI of the parent node belonging to the master cell group (MCG). That is, the IAB node can monitor AI-DCI only through the MCG. Or when the IAB node is connected to a plurality of parent nodes by DAPS-HO, only AI-DCI of a parent node belonging to a source MCG or a target MCG can be monitored. That is, the IAB node can monitor AI-DCI only through the source MCG (or the target MCG). This can be said to be a method of monitoring only AI-DCI transmitted by a specific parent node determined in the specific method when the connection method with the parent nodes is determined as the specific method such as DC or DAPS-HO.

Alternatively, the IAB node may receive information on the parent node (CG) to receive the AI-DCI from a CU/donor node or the like. That is, the IAB node may be provided with information for informing or setting from which parent node AI-DCI should be received from the CU/donor node. When the information about which parent node (CG) the IAB node should receive AI-DCI from is set from the CU/donor node, etc., AI-DCI monitoring can be performed only for the set parent node (CG).

Alt 2. By setting the CSS (cell-specific search space) through which AI-DCI is transmitted only to a specific parent node, the IAB node can monitor only the AI-DCI of the parent node in which the corresponding CSS is set. That is, the IAB node can be set to monitor the CSS through which AI-DCI is transmitted only through one parent node (one CG). Here, the parent node for setting the CSS may be set to a preferred cell ID or the like.

Let the parent node to monitor the AI-DCI determined by at least one of the above methods be referred to as parent node 1 for convenience. Then, the IAB node including the MT and the DU, for the soft resource of the DU, if the parent node 1 indicates "available" for D (downlink) and/or U (uplink) and/or F (flexible) resources, the DU performs an operation and if "available" is not indicated, the MT may perform the operation. For example, when D, U, F symbols are set as soft resources, when the parent node 1 indicates "available" for the D, U, and F symbols, the DU may perform either transmission in the D symbol, reception in the U symbol, or transmission and reception in the F symbol. If the parent node 1 does not indicate "available" for the D, U, and F symbols, the MT may preferentially perform the operation.

Since the parent node other than the parent node 1 does not have operation performance information of the MT of the IAB node, it can be determined as follows.

1) A parent node other than parent node 1 can always determine/assume/expect that it can perform an operation with an IAB node. That is, it is determined that the MT of the IAB node is always available for the configured DU soft resource. In this case, even if the MT of the IAB node is not available, a problem in which a parent node other than the parent node 1 performs transmission/reception with the IAB node may occur.

For example, parent node 2, where the IAB node does not monitor AI-DCI, determines that it can always perform an operation with the MT of the IAB node for the configured DU soft resource, and it can be expected to transmit to or receive from the MT of the IAB node. If the MT-CC transmitting/receiving with the parent node 1 is different from the MT-CC transmitting/receiving with the parent node 2, and the corresponding MT-CC is in a no-TDM relationship with the DU cell, it can communicate with the parent node 2 without any problem. However, even if the MT-CC transmitting and receiving with the parent node 1 is different from the MT-CC transmitting/receiving with the parent node 2, when the corresponding MT-CC is in a TDM relationship with the DU cell or when the same MT-CC transmits/receives to and from the parent node 1 and the parent node 2, in a section in which the MT-CC cannot transmit/receive, the parent node 2 may expect to transmit/receive. That is, the parent node 2 receives the information sent by the IAB node to the parent node 1, or the signal transmitted by the parent node 2 may act as interference between the parent node 1 and the IAB node.

2) A parent node other than parent node 1 may always determine that it cannot perform an operation with the IAB node. That is, it is determined that the MT of the IAB node is not always available for the configured DU soft resource. In this case, even if the MT of the IAB node transmits/receives, the parent link except for the parent node 1 may not perform the transmission/reception operation.

In this case, if the parent node that is the target of AI-DCI monitoring is not switched, that is, if only AI-DCI of one parent node is continuously monitored, other parent nodes may not be able to use soft resources, so the efficiency of resource distribution may be reduced from a network operation point of view. For example, MT-CC in a no-TDM relationship with parent link 1 monitoring AI-DCI can transmit/receive, but it is not used, so efficiency may be reduced.

Figure 18:
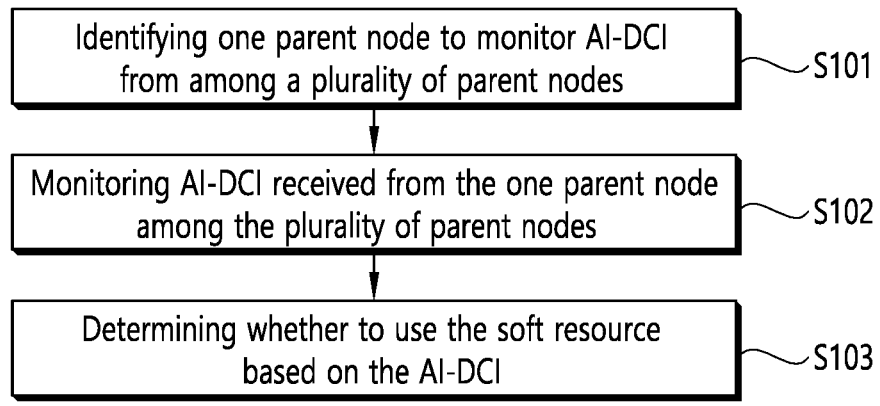
FIG. 18 is an example of an operation method of an IAB node according to scenario 1.

FIG. 18 is an example of an operation method of an IAB node according to Scenario 1.

Referring to FIG. 18, the IAB node identifies one parent node to monitor AI-DCI from among a plurality of parent nodes (S101), and AI-DCI received from the one parent node among the plurality of parent nodes is monitored/detected (S102). The IAB node may determine whether to use the soft resource based on the AI-DCI (S103). A method of identifying one parent node for monitoring AI-DCI among the plurality of parent nodes has been described above (Alt 1, Alt 2).

AI-DCI is a DCI used to inform the availability of soft resources, and may be, for example, the aforementioned DCI format 2_5.

Figure 19:
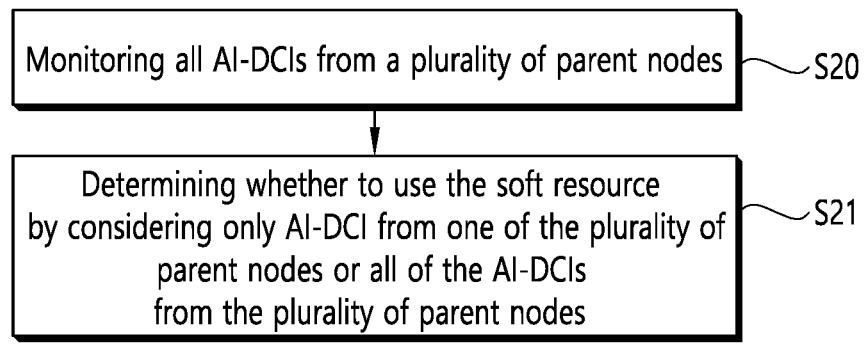
FIG. 19 illustrates an operation method of an IAB node according to scenario 2.

FIG. 19 illustrates an operation method of an IAB node according to Scenario 2.

Referring to FIG. 19, the IAB node monitors all AI-DCIs from a plurality of parent nodes (S20). Whether to use the soft resource may be determined by considering only the AI-DCI from one of the plurality of parent nodes or all of the AI-DCIS from the plurality of parent nodes (S21).

Hereinafter, scenario 2 will be described in detail.

Scenario 2) The IAB node may monitor all AI-DCIs received from a plurality of parent nodes (e.g., two parent nodes). That is, the IAB node may be configured to monitor AI-DCIs from all parent nodes. In this case, the IAB node may consider AI-DCI from a single parent node or monitor AI-DCIs from a plurality of parent nodes. Monitoring AI-DCIs from a plurality of parent nodes but receiving AI-DCI from a single parent node is different from monitoring AI-DCI from the single parent node. The former should attempt to decode all AI-DCIs from a plurality of parent nodes, but the latter has a difference in that only AI-DCI from a single parent node needs to be decoded. Hereinafter, AI-DCIs from a plurality of parent nodes are monitored, but receiving AI-DCI from a single parent node is referred to as scenario 2-1, and a case of receiving a plurality of AI-DCIs by monitoring AI-DCIs from a plurality of parent nodes is referred to as scenario 2-2.

Scenario 2-1) When an IAB node monitors AI-DCIs from a plurality of parent nodes but only considers AI-DCI information from a single parent node, this is a case where AI-DCIs from a plurality of parent nodes are always monitored or configured to operate as such. That is, although the IAB node monitors AI-DCIs from a plurality of parent nodes, the IAB node may operate in consideration of only AI-DCI (availability indication information) from one parent node.

Scenario 2-1 can be further subdivided. For example, it can be divided into scenario 2-1.1 where AI-DCI is not received, scenario 2-1.2 where a single AI-DCI is received, and scenario 2-1.3 where a plurality of AI-DCIs are received but only a single AI-DCI is considered. It will be described later. In scenario 2-1, characteristically, a parent node that has not transmitted AI-DCI does not know whether another parent node has transmitted AI-DCI. That is, the parent node that does not transmit AI-DCI cannot distinguish the following scenarios 2-1.1 and 2-1.2.

Scenario 2-1.1) When the IAB node monitors AI-DCIS from a plurality of parent nodes but does not receive AI-DCI (when AI-DCI is not detected), the IAB node cannot distinguish between i) that each parent node does not indicate AI-DCI and ii) that each parent node indicates AI-DCI but the IAB node fails to detect. In order to exclude such ambiguity, the IAB node may consider/assume the following case in the above situation.

Alt 1. It can be assumed that all parent nodes do not transmit AI-DCI. In this case, for the configured DU soft resource, if the MT does not use it or does not affect the MT, the DU may use it. That is, the MT has priority over soft resources, and the DU uses the soft resource only when the MT does not use the soft resource or when the DU does not affect the operation of the MT even if the DU uses the soft resource.

Alt 2. It can be assumed that AI-DCI was transmitted against the existing default operation, but detection failed. In this case, the DU can use the configured DU soft resource.

Scenario 2-1.2) When AI-DCIs from a plurality of parent nodes (e.g., parent node 1, parent node 2) are monitored but AI-DCI from a single parent node (e.g., parent node 1) is received, the IAB node may determine the operation in consideration of the corresponding AI-DCI information. In such a case, the parent node that has not transmitted AI-DCI (e.g., parent node 2) may consider/assume/expect the following operation.

Alt 1. A parent node that does not transmit AI-DCI may determine/assume that it can always perform an operation with the IAB node (specifically, the MT of the IAB node) in the DU soft resource of the IAB node. That is, it can always be determined that the configured DU soft resource of the IAB node is not available (determined that it cannot be used by the DU). In this case, there may be a problem in that the parent node (parent node 2) performs transmission/reception even though the MT of the IAB node does not operate in the DU soft resource.

That is, all MT-CCs in a TDM relationship with a DU in an IAB node that receives AI-DCI and uses DU soft resources cannot transmit and receive with parent nodes, which do not transmit AI-DCI, that have a parent link and a problem may occur because the corresponding parent nodes determine that transmission and reception are possible. On the other hand, all MT-CCs in a no-TDM relationship with a DU in an IAB node that receives AI-DCI and uses DU soft resources can transmit/receive with parent nodes that do not transmit AI-DCI having a parent link. It is determined that the corresponding parent nodes are also capable of transmitting and receiving, so that resources can be efficiently used.

Alt 2. The parent node (parent node 2) that does not transmit AI-DCI may determine that it cannot always perform an operation with the IAB node (specifically, the MT of the IAB node) in the configured DU soft resource. That is, by changing the existing default operation, it is possible to always determine that the DU soft resource configured by the IAB node is available (i.e., it is determined that it is used by the DU). In this case, the IAB node (specifically, the MT of the IAB node) may not perform transmission/reception with the parent link with the parent node (parent node 2) that does not transmit AI-DCI.

That is, opposite to Alt 1 above, all MT-CCs in a TDM relationship with a DU in an IAB node that receives AI-DCI and uses DU soft resources cannot transmit and receive with parent nodes that have a parent link and do not transmit AI-DCI. The parent nodes also determine so, therefore, there is no problem in transmission and reception. On the other hand, all MT-CCs in a no-TDM relationship with a DU in an IAB node that receives AI-DCI and uses DU soft resources can transmit and receive with a parent node that has a parent link and does not transmit AI-DCI, but corresponding parent nodes may not perform transmission/reception by determining that transmission/reception is impossible.

Scenario 2-1.3) The IAB node monitors AI-DCIS from a plurality of parent nodes, and may receive AI-DCIS from a plurality of parent nodes. For example, the IAB node may monitor AI-DCIs from the parent nodes 1 and 2, and the first AI-DCI may be received from the parent node 1 and the second AI-DCI may be received from the parent node 2. In this case, the IAB node may determine that only AI-DCI from one parent node is valid. At least one of the following methods may be considered in relation to which AI-DCI among a plurality of received AI-DCIS is determined to be valid.

Alt 1. Only AI-DCI transmitted from a parent node (or CG) with a high priority may be determined to be valid, and it may be determined that the configured DU soft resource is available. In this case, the parent node (CG) having the high priority may be set from, for example, a CU/donor node through RRC/F1-AP.

Alt 2. Only AI-DCI received first or last received within a specific time/frequency window may be determined to be valid.

Alt 3. AI-DCI reception valid period for each parent node (CG) or to some parent nodes (CG) in a specific unit (e.g., slot) within the time interval or in a specific unit (e.g., RB/RE, etc.) within the frequency interval can be set. It can be determined that only the AI-DCI received from the corresponding parent node (CG) is valid within the corresponding period, and thus the configured DU soft resource is available. When the AI-DCI reception valid period is set only for some parent nodes (CG), contention based operation is performed for the remaining time period. And, when collision of AI-DCIS occurs, collision handling as in Scenario 2-2 may be applied.

For example, if an IAB node has two parent nodes and monitors AI-DCI in a specified number of X slots, in the X slots, a time interval in which the reception AI-DCI received from the parent node 1 and the parent node 2 is valid may be allocated by dividing the time interval of A:B. Here, A and B may be assigned the same value or different values. Alternatively, in a ratio of A:B, only AI-DCI of parent node 1 is monitored during time period A, and AI-DCI may be received for the remaining time period based on contention.

By dividing the determined time interval by the number of parent nodes to set the interval in which AI-DCI of each parent node is valid, and it can be determined to be valid only when received within the corresponding interval.

Alt 4. If the IAB node is connected to the parent nodes in the form of DC (dual connectivity), only AI-DCI transmitted from a parent node belonging to an MCG or a secondary cell group (SCG) may be determined to be valid.

Alt 5. When the IAB node is connected to the parent nodes in the form of DAPS-HO (dual active protocol stack solution hand over), only AI-DCI transmitted from a parent node belonging to the source MCG or the target MCG may be determined to be valid.

In the case of a parent node that does not transmit the available AI-DCI by at least one of the methods of the Alt. 1 to Alt. 5, the following operation may be considered/ assumed/expected.

A parent node that has transmitted an unavailable AI-DCI needs to know that its AI-DCI information is not available. In such a case, the parent node that has transmitted the AI-DCI that is not available may consider the operations of Alt 1 and Alt 2 in Scenario 2-1.2.

A parent node that does not transmit an unavailable AI-DCI must be able to know that the AI-DCI it has transmitted is not available. To this end, the IAB node may notify the parent node which has transmitted the unavailable AI-DCI that the corresponding AI-DCI is not available. Such information may be transmitted, for example, through a channel such as PUCCH.

Scenario 2-2) When monitoring AI-DCIs from a plurality of parent nodes, the IAB node may operate in consideration of AI-DCIs (AI information) from a plurality of parent nodes. That is, when the IAB node monitors AI-DCIs from a plurality of parent nodes, it is possible to determine whether the DU and MT of the IAB node operate in consideration of all AI (availability indication) information from the parent nodes. In this case, the IAB node may determine resource availability as follows, and the operation of each parent node may be considered as follows.

Figure 20:
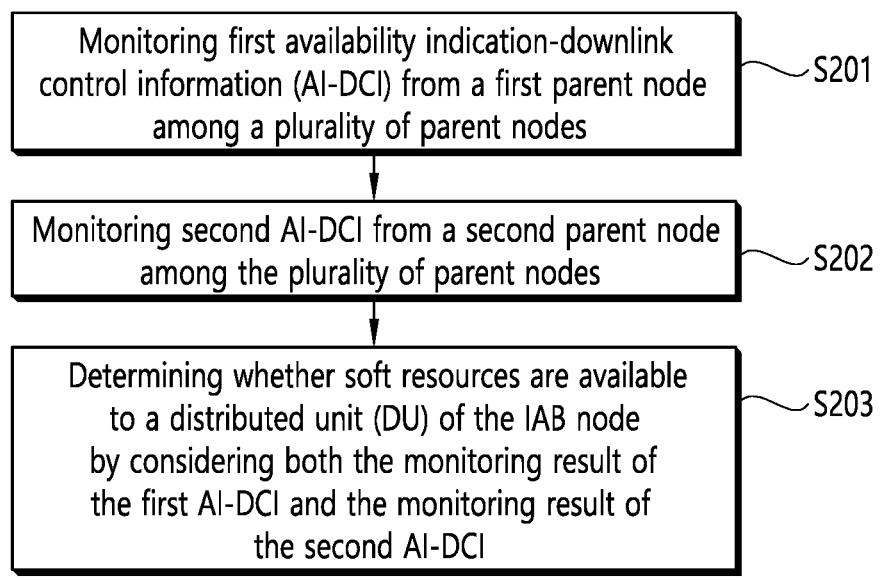
FIG. 20 illustrates an operation method of an IAB node connected to a plurality of parent nodes in a wireless communication system.

FIG. 20 illustrates an operation method of an IAB node connected to a plurality of parent nodes in a wireless communication system.

Referring to FIG. 20, the IAB node monitors first availability indication-downlink control information (AI-DCI) from a first parent node among a plurality of parent nodes (S201).

The IAB node monitors a second AI-DCI from a second parent node among the plurality of parent nodes (S202).

In consideration of both the monitoring result of the first AI-DCI and the monitoring result of the second AI-DCI, the IAB node determines whether soft resources are available to a distributed unit (DU) of the IAB node (S203).

When both the first AI-DCI and the second AI-DCI indicate that they are available, the soft resources may be determined to be available for the DU of the IAB node.

Alternatively, if at least one of the first AI-DCI and the second AI-DCI indicates that they are available, the soft resources may be determined to be available for the DU of the IAB node.

If it is determined that the soft resources are available to the DU of the IAB node, the DU of the IAB node may communicate with a UE (child node) connected to the IAB node in the soft resources.

If at least one of the first AI-DCI and the second AI-DCI does not indicate that they are available, the soft resources may be determined not to be available for the DU of the IAB node. In this case, the soft resources may be used by a mobile terminal (MT) of the IAB node. More specifically, the soft resources may be used for communication between the MT of the IAB node and a parent node that does not indicate that the soft resources are available.

If both the first AI-DCI and the second AI-DCI do not indicate that they are available, the soft resource may be used by the MT of the IAB node.

Now, considering both the monitoring result of the first AI-DCI and the monitoring result of the second AI-DCI, a method of determining whether soft resources are available to the DU of the IAB node, the operation of the IAB node at that time, the operation of the parent node, and the like will be described in more detail.

Alt 1. When at least one parent node indicates that a specific DU soft resource is available, it may be determined that the configured DU soft resource is available.

In this case, the IAB node may consider the following operation.

For a specific DU soft resource, when at least one parent node among the parent nodes (parent nodes to be monitored) where IAB node monitors AI-DCI indicates that it is available, a DU operation may be performed on a corresponding resource (DU soft resource). Alternatively, if all parent nodes (parent nodes to be monitored) where IAB node monitors AI-DCI do not indicate that a specific configured DU soft resource is available, an MT operation may be performed on the corresponding resource.

Also, in such a case, each parent node may consider the following operation.

When the parent node instructs the IAB node to be available for a specific configured DU soft resource of the IAB node, the parent node assumes that the IAB node does not perform an MT operation and may not expect transmission/reception with the IAB node. Or, if the parent node does not instruct the IAB node to be available for the specific configured DU soft resource of the IAB node, the parent node may perform transmission/reception operation with the IAB node on the assumption that the IAB node performs the MT operation. However, the IAB node may not be able to transmit/receive with the corresponding parent node.

For example, when an IAB node has a parent link with a parent node 1 and a parent node 2, respectively, and receives AI-DCI from the parent link 1, the DU of the parent node 1 may not expect transmission/reception with the IAB node. The DU of the IAB node in the TDM relationship with the MT of the IAB node forming the parent link 1 is expected to use soft resources, and the MT in the IAB node in the TDM relationship with the DU may similarly not be able to perform transmission/reception. If the MT configures the parent link 2, the parent node 2 does not transmit the AI-DCI and thus can expect transmission/reception with the IAB node, but the MT may not be able to perform transmission/reception according to the TDM relationship.

Alt 2. For a specific configured DU soft resource, when all parent nodes for AI-DCI monitoring indicate that it is available, it can be determined that the corresponding DU soft resource is available. For example, when the IAB node is configured to monitor AI-DCIS transmitted from parent nodes 1 and 2, if all of the parent nodes 1 and 2 indicate that the specific DU soft resources are available through AI-DCI (for example, parent node 1 via a first AI-DCI, parent node 2 via a second AI-DCI), it may be determined that the specific DU soft resources are available.

Figure 21:
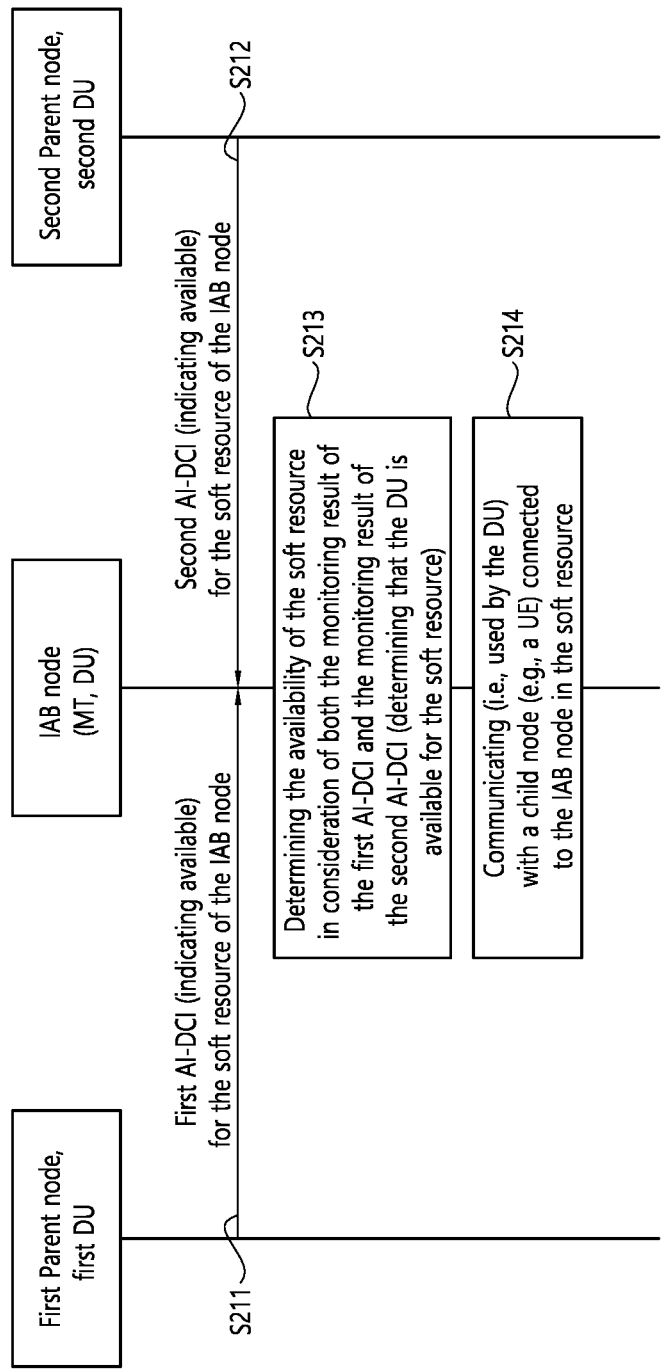
FIG. 21 illustrates a method of operating an IAB node according to Alt 2 described above.

FIG. 21 illustrates a method of operating an IAB node according to Alt 2 described above.

Referring to FIG. 21, the IAB node may be connected to a first parent node and a second parent node. The first parent node provides the first AI-DCI for the soft resource to the IAB node (S211). The first AI-DCI may indicate available for the soft resource.

The second parent node provides the second AI-DCI for the soft resource to the IAB node (S212). The second AI-DCI may indicate available for the soft resource.

In this case, the IAB node determines the availability of the soft resource (determining that the DU is available for the soft resource) in consideration of both the first AI-DCI monitoring result and the second AI-DCI monitoring result (S213).

The IAB node may communicate (i.e., used by the DU) with a child node (e.g., a UE) connected to the IAB node in the soft resource (S214).

That is, when all parent nodes where the IAB node monitors AI-DCI indicate that a specific configured DU soft resource is available, it may be determined that the corresponding DU soft resource is available.

Figure 22:
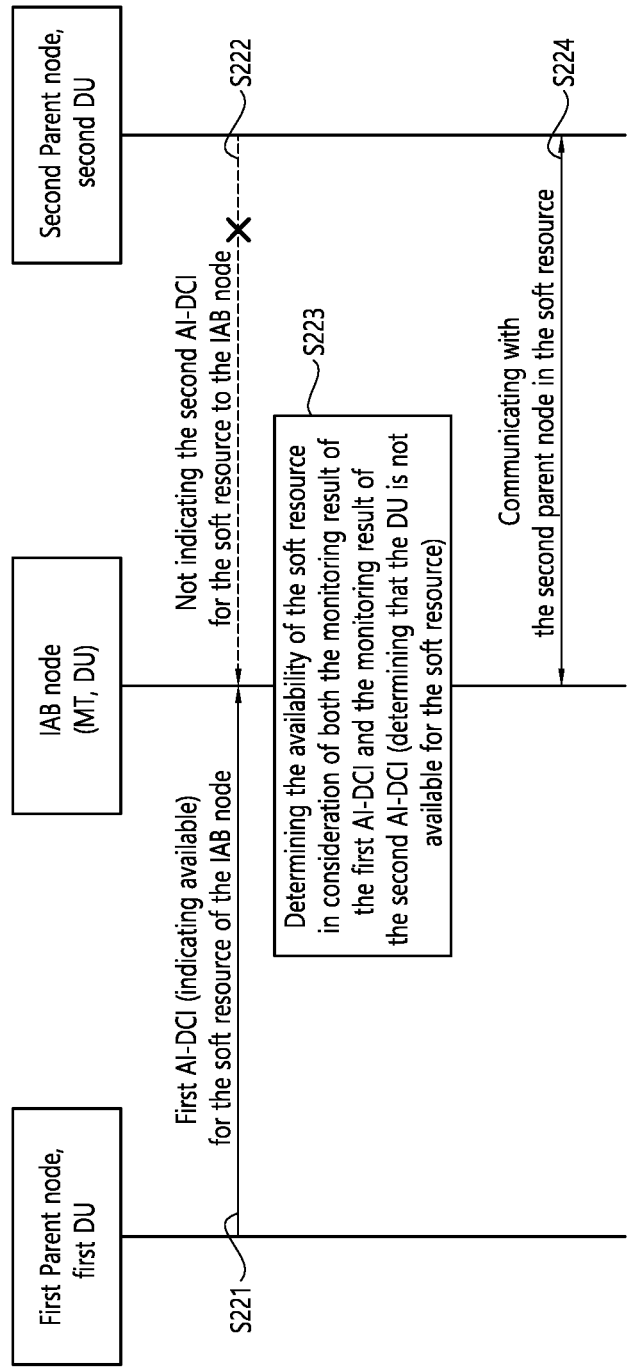
FIG. 22 is another example of an operation method of an IAB node according to Alt 2 described above.

FIG. 22 is another example of an operation method of an IAB node according to Alt 2 described above.

Referring to FIG. 22, the IAB node may be connected to a first parent node and a second parent node. The first parent node provides the first AI-DCI for the soft resource to the IAB node (S221). The first AI-DCI may indicate available for the soft resource.

The second parent node may not indicate the second AI-DCI for the soft resource to the IAB node (S222).

In this case, the IAB node determines the availability of the soft resource in consideration of both the first AI-DCI monitoring result and the second AI-DCI monitoring result (that is, it is determined that the DU is not available for the soft resource) (S223).

The IAB node (the MT of the IAB node) may communicate with the second parent node (i.e., the parent node that does not provide AI-DCI for the soft resource) in the soft resource (S224).

That is, for a specific configured DU soft resource, if at least one of the parent nodes where the IAB node performs monitoring of AI-DCI does not indicate that it is available, it may be determined that the corresponding DU soft resource is not available. That is, the IAB node may perform the MT operation on the corresponding DU soft resource. In this case, in the corresponding DU soft resource, the IAB node may perform transmission/reception with the parent node(s) which does not indicate it to be available.

Also, in such a case, each parent node may consider the following operation.

For a specific configured DU soft resource of an IAB node, when each parent node instructs the IAB node that it is available, each parent node assumes that the IAB node does not perform MT operation and may not expect transmission/reception with the IAB node. However, the IAB node may determine that transmission/reception with the corresponding parent node is possible.

For a specific configured DU soft resource of the IAB node, if the parent node does not instruct the IAB node to be available, the parent node may perform transmission/reception operation with the IAB node assuming that the IAB node performs the MT operation.

For example, if an IAB node has parent node 1, parent node 2 and parent link exist (parent link 1 between IAB node and parent node 1, parent link 2 between IAB node and parent node 2), and if AI-DCI is not received from parent link 2, the IAB node may determine that the corresponding DU soft resource is not available. MT in the TDM relationship or in the no-TDM relationship with the DU of the IAB node that have not received the AI-DCI may determine to be able to transmit/receive and can expect transmission/reception. However, when AI-DCI is received from parent link 1, a DU in a TDM relationship with the MT that has received the AI-DCI may use the resource. Therefore, the MT in the TDM relationship with the corresponding DU may not be able to transmit/receive operation on the corresponding DU soft resource.

In the circumstances described above, from the point of view of the IAB node, if "available" and/or "not available" information for D and/or U and/or F resources has not been explicitly instructed from a specific parent node, the IAB node may assume that it is not instructed that the DU soft resource is available from the corresponding parent node. Alternatively, by changing the existing default operation, the IAB node may assume that it is indicated that the DU soft resource is available from the corresponding parent node.

MT1 and MT2 in the IAB node are connected to the parent node 1 (DU cell 1) and the parent node 2 (DU cell 2), respectively, and one DU cell (DU cell 3) may exist in the same IAB node. An IAB-node may receive an availability indication (e.g., AI-DCI) from one parent node. That is, the MT1 may receive the soft resource availability information of the DU cell 3 from the parent node 1, or the MT2 may receive the soft resource availability information of the DU cell 3 from the parent node 2. In this case, the method of the above scenario 1) may be applied to the specific AI-DCI reception method and the operation of the IAB node.

MT1 and MT2 in the IAB node are connected to the parent node 1 (DU cell 1) and the parent node 2 (DU cell 2), respectively, and two DU cells (DU cell 3 and DU cell 4, respectively) may exist in the same IAB node. In this case, a parent node transmitting the soft resource availability indication for DU cell 3 and a parent node transmitting the soft resource availability indication for DU cell 4 may be different from each other. For example, MT1 may receive soft resource availability information for DU cell 3 from parent node 1, and MT2 may receive soft resource availability information for DU cell 4 from parent node 2. In this case, which MT receives the soft resource availability information for which DU cell from the parent node may be configured by network configuration. In this case, the method of scenario 2) may be applied to the specific AI-DCI reception method from the two parent nodes and the operation of the IAB node.

Which one of the above-described scenario 1 (that is, a scenario in which an IAB node has multiple parent nodes, but monitors AI-DCI only for a single parent node) and scenario 2 (scenario of receiving multiple AI-DCIS by monitoring AI-DCI from multiple parent nodes) is applied may be determined according to a method in which the plurality of parent nodes and the IAB node are connected, a configuration of a carrier, and the like.

In the frequency domain, a carrier may be included in a band. One or a plurality of carriers may be included in one band, or carriers may be included in different bands. For example, i) carrier #1 is included in band #1 and carrier #2 is included in band #2 or ii) carrier #1 and carrier #2 are included in band #1. Carriers #1 and #2 may be different carriers. The use of different carriers in different bands as in i) can be referred to as inter-carrier and inter band (inter-carrier, inter band), and the use of different carriers in the same band as in ii) can be referred to as inter-carrier and intra band (inter-carrier, intra band).

For example, when the MT of the IAB node is connected to two parent nodes by DC (dual connectivity), and when two carriers used for the DC connection are i) inter-carrier and inter-band, the method of the above-described scenario 1 is applied when determining the soft resource availability of the DU cell of the IAB node. If the two carriers are ii) inter-carrier and intra-band, the method of scenario 2 (more specifically, scenario 2-2) may be applied when determining the availability of the soft resource of the DU cell of the IAB node.

<Dual-Connectivity to Support Multiple Parent DUs>
(1) Inter-Donor Multi-Parent Nodes Operation Scenario 1: Scenario where an IAB node is multi-connected with two donors.

Scenario 2: Scenario where an IAB node's parent/ancestor node is multi-connected with two donors.

In both scenarios, the boundary IAB node is simultaneously connected to two parent nodes (i.e., IAB1 and IAB2) belonging to two different donors (i.e., donor 1 and donor 2). In this case, whether to support simultaneous connection to two different parent nodes belonging to two different donors may be a problem. In NR Rel-17, at least intra-donor multi-parent operation is supported, and thus inter-donor topology redundancy can be supported.

In order to support two parent nodes under the control of two different donors, each CU must share all configuration information of DU from a higher CU to an adjacent CU. If such information can be dynamically shared, two parent nodes belonging to different donors can dynamically schedule resources. However, if information is shared long-termly, the two parent nodes may schedule the resource in a semi-static manner. Meanwhile, inter-carrier, inter-band, 'inter-carrier, intra-band' (for at least FR2) DC may be supported. In order to operate an 'inter-carrier, intra-band' based DC scenario, two parent nodes need to share the TDD U/D configuration and the H/S/NA configuration. That is, in order to support two parent nodes belonging to different donors, each CU must share all configuration information of DU from the CU to which the DU currently belongs to the CU to which the DU for multi-parent operation belongs.

2. DC Scenario (Inter-Carrier, Intra-Band)

In NR Rel-15 and Rel-16, NR designed dual connectivity for FR1/FR1 and FR1/FR2. In this scenario, it is assumed that the carriers of dual connectivity are far apart, so the inter-carrier interference is negligible. Accordingly, each DU may independently allocate D/U resources to the UE. In addition, it is assumed that the UE can simultaneously receive a channel/signal from two cells of different carriers of FR1/FR1 or FR1/FR2.

However, considering the inter-carrier, intra-band DC scenario in FR2, it is necessary to clarify the operation of transmission and reception of MT in terms of antenna configuration (same panel/separate panel for multiple carriers) and carrier combination. Therefore, for the inter-carrier, intra-band DC scenario of FR2, it is necessary to clarify the MT operation of transmission and reception for antenna configuration and carrier combination.

In other words, to operate an inter-carrier, intra-band DC scenario for FR2, it is necessary to clarify the MT operation for transmission and reception in terms of antenna configuration (e.g. same panel/separated panel for multiple carriers) and carrier combinations.

3. Indication of Soft Resources for Multi-Parent Scenario

In order to support multi-parent of Rel-17, it has been agreed to explicitly indicate soft resources using DCI format 2_5. In the DC scenario, both parent DUs may be independently provided with resource information related to IAB-DU. Also, in a multi-parent scenario, it should be considered whether the parent DU can receive information (at least resource availability factor (i.e., H/S/NA), type of link direction (i.e., D/F/U), ability of multiplexing) related to the IAB DU.

Under the assumption that dynamic scheduling and information necessary for scheduling (which may be the above information) exist, a conflict of instructions for soft resources from each parent DU may be considered.

Figure 23:
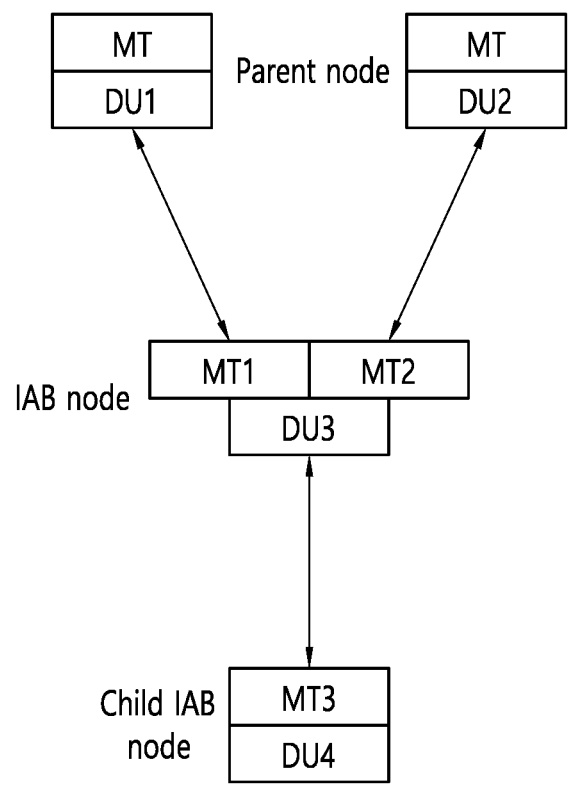
FIG. 23 is an example of a multi-parent scenario.

FIG. 23 is an example of a multi-parent scenario.

Referring to FIG. 23, it is assumed that the MT of the multi-carriers MT1 and MT2 is connected to two parent nodes, and the IAB-DU (DU3) can receive information from one parent DU (DU1). In this scenario, if both parent DUs have the multiplexing capability and resource availability of IAB-DU, two parent DUs can operate well in the dual connectivity without scheduling conflicts. However, if the parent DU indicates to the IAB-MT the type of soft symbol by the resource availability element (resourceAvailability) and DCI format 2_5, conflicts may arise in resource scheduling. For example, if the parent DU (DU1) has indicated the resource availability of the IAB-DU (DU3) and the other parent DU (DU2) has not obtained the resource availability information, the scheduling information of the IAB-MT (MT2) from the parent DU (DU2) may or may not be acceptable depending on the multiplexing capability of the IAB-node. In this case, that is, if the scheduling information from the parent DU (DU2) is not acceptable for the multiplexing operation of the IAB node, IAB-nodes must decide for themselves to transmit and receive.

Figure 24:
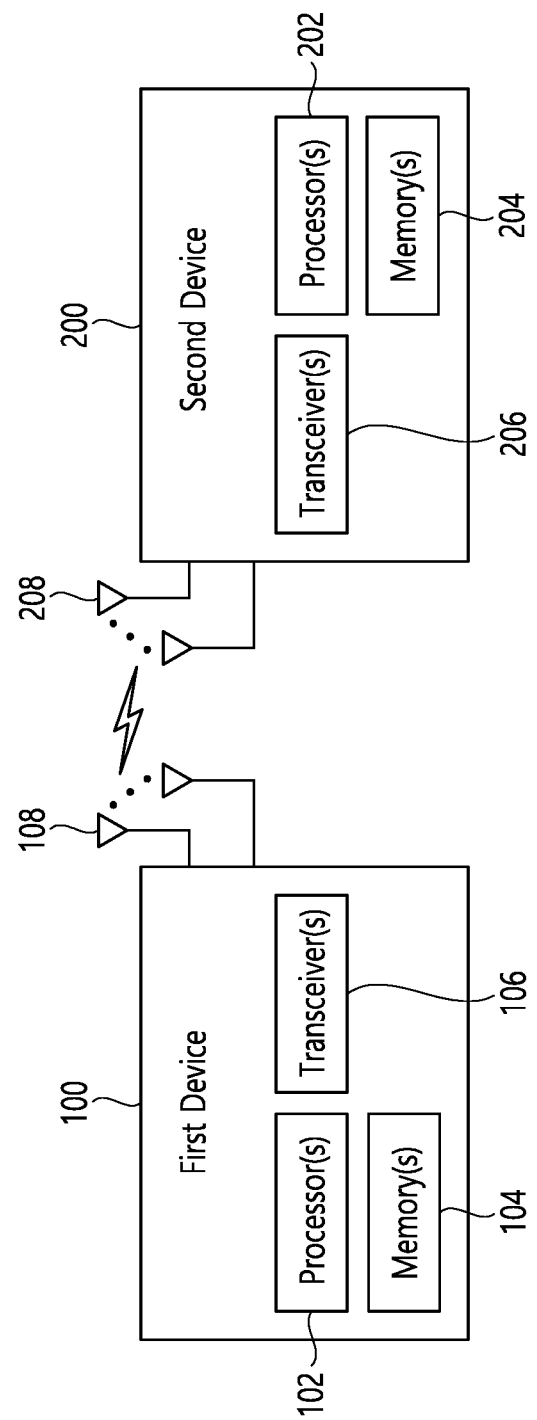
FIG. 24 illustrates an example of a wireless communication device for implementing the present specification.

FIG. 24 illustrates a wireless device applicable to the present specification.

Referring to FIG. 24, a first wireless device 100 and a second wireless device 200 may transmit radio signals through a variety of RATs (e.g., LTE and NR).

The first wireless device 100 may include one or more processors 102 and one or more memories 104 and additionally further include one or more transceivers 106 and/or one or more antennas 108. The processors 102 may control the memory 104 and/or the transceivers 106 and may be configured to implement the descriptions, functions, procedures, proposals, methods, and/or operational flowcharts disclosed in this document. For example, the processors 102 may process information within the memory 104 to generate first information/signals and then transmit radio signals including the first information/signals through the transceivers 106. In addition, the processor 102 may receive radio signals including second information/signals through the transceiver 106 and then store information obtained by processing the second information/signals in the memory 104. The memory 104 may be connected to the processor 102 and may store a variety of information related to operations of the processor 102. For example, the memory 104 may store software code including commands for performing a part or the entirety of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. The transceiver 106 may include a transmitter and/or a receiver. The transceiver 106 may be interchangeably used with a radio frequency (RF) unit. In the present specification, the wireless device may represent a communication modem/circuit/chip.

The second wireless device 200 may include one or more processors 202 and one or more memories 204 and additionally further include one or more transceivers 206 and/or one or more antennas 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signals and then transmit radio signals including the third information/signals through the transceiver 206. In addition, the processor 202 may receive radio signals including fourth information/signals through the transceiver 106 and then store information obtained by processing the fourth information/signals in the memory 204. The memory 204 may be connected to the processor 202 and may store a variety of information related to operations of the processor 202. For example, the memory 204 may store software code including commands for performing a part or the entirety of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. The transceiver 206 may include a transmitter and/or a receiver. The transceiver 206 may be interchangeably used with an RF unit. In the present specification, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202.

The one or more processors 102 and 202 may be implemented with at least one computer readable medium (CRM) including instructions to be executed by at least one processor.

That is, at least one computer readable medium (CRM) having an instruction to be executed by at least one processor to perform operations includes, monitoring a first availability indication-downlink control information (AI-DCI) from a first parent node among a plurality of parent nodes, monitoring a second AI-DCI from a second parent node among the plurality of parent nodes, considering both the monitoring result of the first AI-DCI and the monitoring result of the second AI-DCI and determining whether a soft resource is available to a distributed unit (DU) of the IAB node.

The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. In addition, the one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. In addition, the one or more processors 102 and 202 may perform control so that the one or more transceivers 106 and 206 may receive user data, control information, or radio signals from one or more other devices. In addition, the one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 25:
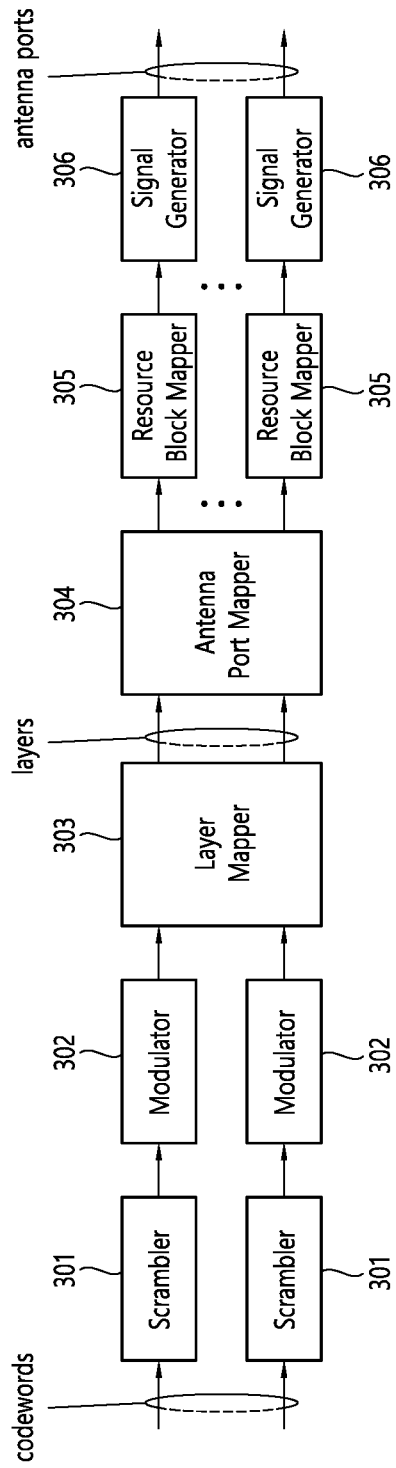
FIG. 25 shows an example of the structure of a signal processing module.

FIG. 25 shows an example of a structure of a signal processing module. Herein, signal processing may be performed in the processors 102 and 202 of FIG. 24.

Referring to FIG. 25, the transmitting device (e.g., a processor, the processor and a memory, or the processor and a transceiver) in a UE or BS may include a scrambler 301, a modulator 302, a layer mapper 303, an antenna port mapper 304, a resource block mapper 305, and a signal generator 306.

The transmitting device can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 26:
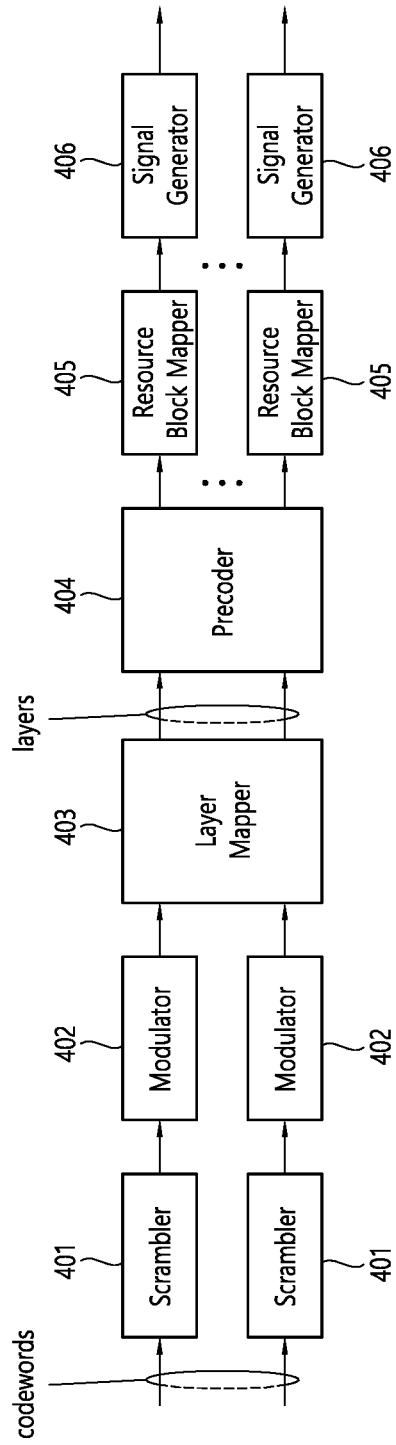
FIG. 26 shows another example of the structure of a signal processing module in a transmission device.

FIG. 26 shows another example of a structure of a signal processing module in a transmitting device. Herein, signal processing may be performed in a processor of a UE/BS, such as the processors 102 and 202 of FIG. 24.

Referring to FIG. 26, the transmitting device (e.g., a processor, the processor and a memory, or the processor and a transceiver) in the UE or the BS may include a scrambler 401, a modulator 402, a layer mapper 403, a precoder 404, a resource block mapper 405, and a signal generator 406.

The transmitting device can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder 404 for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N×M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter.

The signal processing procedure of the receiving device may be reverse to the signal processing procedure of the transmitting device. Specifically, the processor of the transmitting device decodes and demodulates RF signals received through antenna ports of the transceiver. The receiving device may include a plurality of reception antennas, and signals received through the reception antennas are restored to baseband signals, and then multiplexed and demodulated according to MIMO to be restored to a data string intended to be transmitted by the transmitting device. The receiving device may include a signal restoration unit that restores received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit that removes a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 27:
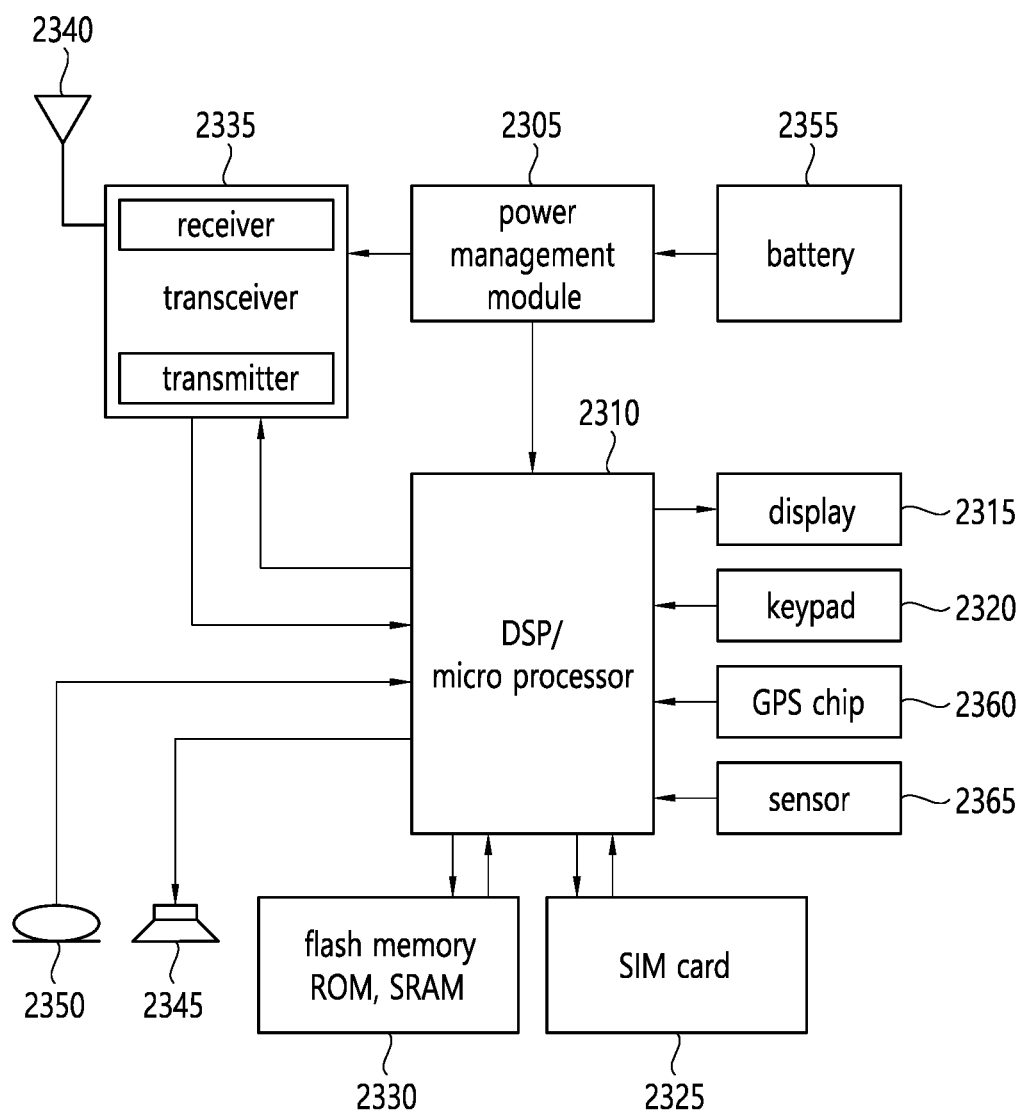
FIG. 27 illustrates an example of a wireless communication device according to an embodiment of the present disclosure.

FIG. 27 illustrates an example of a wireless communication device according to an implementation example of the present disclosure.

Referring to FIG. 27, the wireless communication device, for example, a UE may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 27 may be the processors 102 and 202 in FIG. 24.

The memory 2330 is connected to the processor 2310 and stores information related to operations of the processor. The memory may be located inside or outside the processor and connected to the processor through various techniques such as wired connection and wireless connection. The memory 2330 in FIG. 27 may be the memories 104 and 204 in FIG. 24.

A user can input various types of information such as telephone numbers using various techniques such as pressing buttons of the keypad 2320 or activating sound using the microphone 2350. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 27 may be the transceivers 106 and 206 in FIG. 24.

Although not shown in FIG. 27, various components such as a camera and a universal serial bus (USB) port may be additionally included in the UE. For example, the camera may be connected to the processor 2310.

FIG. 27 is an example of implementation with respect to the device and implementation examples of the present disclosure are not limited thereto. The device need not essentially include all the components shown in FIG. 27. That is, some of the components, for example, the keypad 2320, the GPS chip 2360, the sensor 2365 and the SIM card 2325 may not be essential components. In this case, they may not be included in the device.

Figure 28:
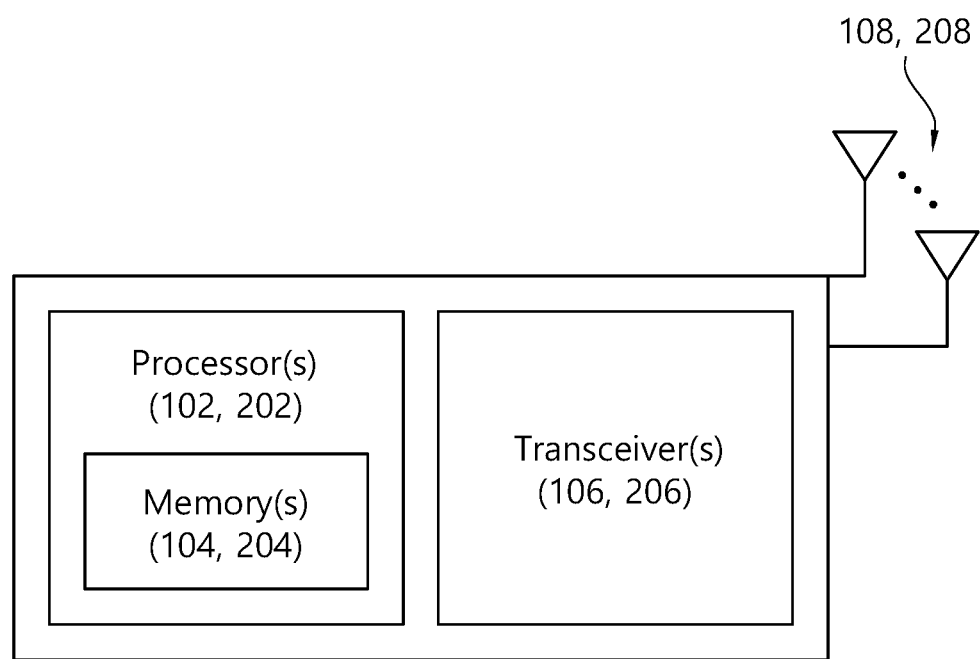
FIG. 28 shows another example of a wireless device.

FIG. 28 shows another example of a wireless device.

Referring to FIG. 28, the wireless device may include one or more processors 102 and 202, one or more memories 104 and 204, one or more transceivers 106 and 206 and one or more antennas 108 and 208.

The example of the wireless device described in FIG. 28 is different from the example of the wireless described in FIG. 24 in that the processors 102 and 202 and the memories 104 and 204 are separated in FIG. 24 whereas the memories 104 and 204 are included in the processors 102 and 202 in the example of FIG. 28. That is, the processor and the memory may constitute one chipset.

Figure 29:
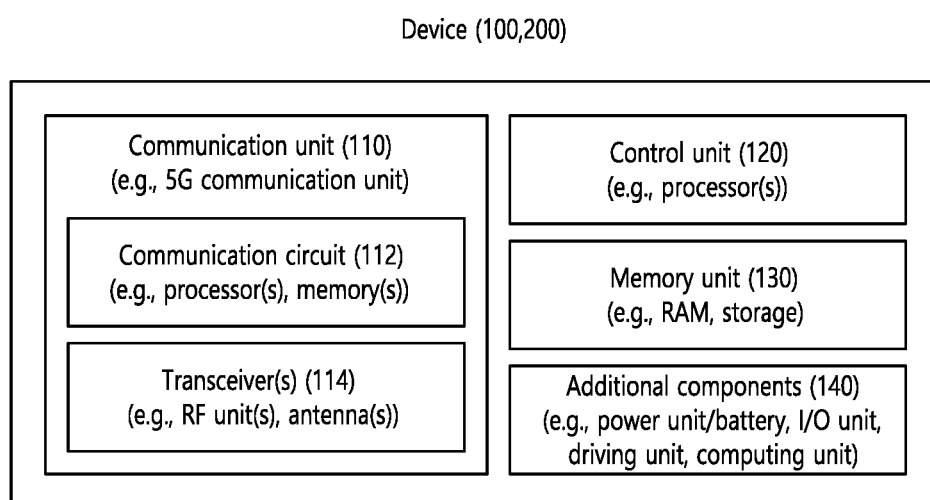
FIG. 29 shows another example of a wireless device applied to the present specification.

FIG. 29 shows another example of a wireless device applied to the present specification. The wireless device may be implemented in various forms according to a use-case/service.

Referring to FIG. 29, wireless devices 100 and 200 may correspond to the wireless devices 100 and 200 of FIG. 24 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204. For example, the transceiver(s) 114 may include the one or more transceivers 106 and 206 and/or the one or more antennas 108 and 208 of FIG. 24. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. In addition, the control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot, the vehicles, the XR device, the hand-held device, the home appliance, the IoT device, a digital broadcast UE, a hologram device, a public safety device, an MTC device, a medicine device, a fintech device (or a finance device), a security device, a climate/environment device, the AI server/device, the BSs, a network node, etc. The wireless device may be used in a mobile or fixed place according to a use-example/service.

Figure 30:
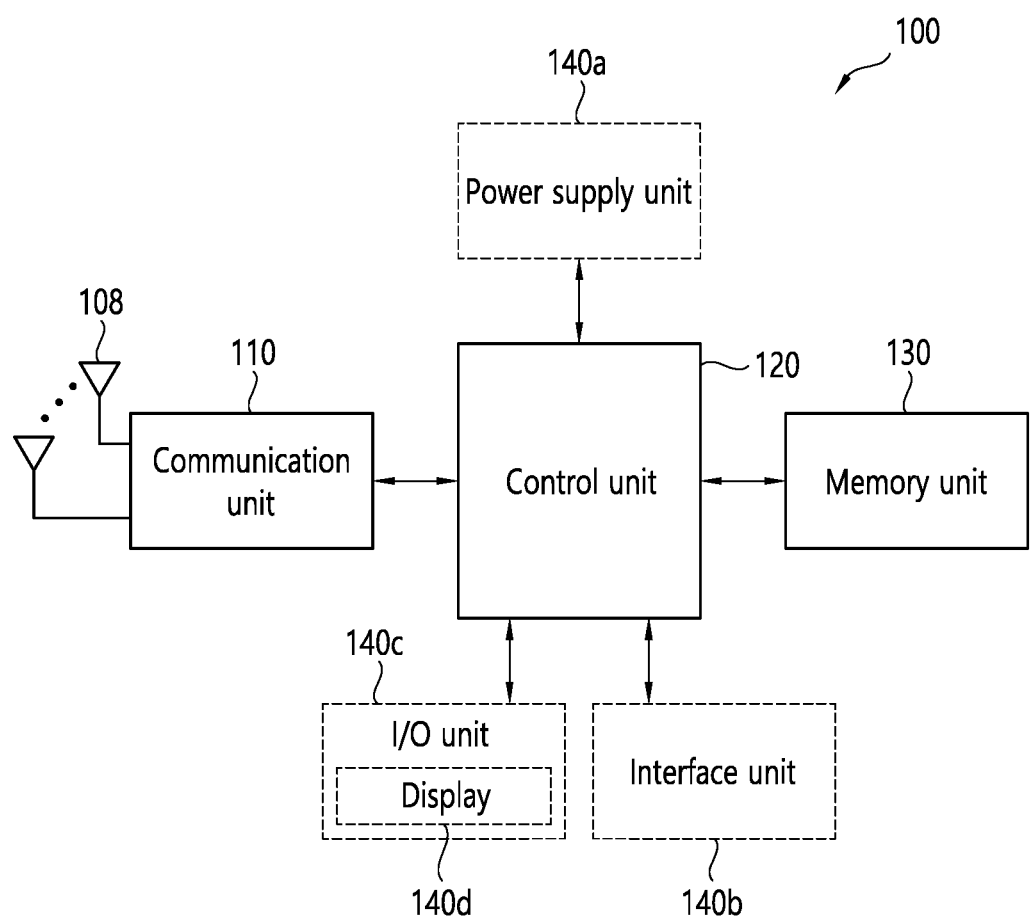
FIG. 30 illustrates a hand-held device applied to the present specification.

FIG. 30 illustrates a hand-held device applied to the present specification. The hand-held device may include a smartphone, a smart-pad, a wearable device (e.g., a smartwatch or a smart-glasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 30, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* respective correspond to the blocks 110 to 130/140 of FIG. 29.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. In addition, the memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

For example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. In addition, the communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Meanwhile, the NR supports multiple numerologies (or subcarrier spacing (SCS)) for supporting diverse 5G services. For example, if the SCS is 15 kHz, a wide area of the conventional cellular bands may be supported. If the SCS is 30 kHz/60 kHz, a dense-urban, lower latency, and wider carrier bandwidth is supported. If the SCS is 60 kHz or higher, a bandwidth greater than 24.25 GHz is used in order to overcome phase noise.

An NR frequency band may be defined as a frequency range of two types (FR1, FR2). Values of the frequency range may be changed. For example, the frequency range of the two types (FR1, FR2) may be as shown below in Table 7. For convenience of explanation, among the frequency ranges that are used in an NR system, FR1 may mean a "sub 6 GHz range", and FR2 may mean an "above 6 GHz range" and may also be referred to as a millimeter wave (mmW).

TABLE 7

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed. For example, as shown in Table 8 below, FR1 may include a band in the range of 410 MHz to 7125 MHz. That is, FR1 may include a frequency band of at least 6 GHz (or 5850, 5900, 5925 MHz, and so on). For example, a frequency band of at least 6 GHz (or 5850, 5900, 5925 MHz, and so on) included in FR1 may include an unlicensed band. The unlicensed band may be used for diverse purposes, e.g., the unlicensed band for vehicle-specific communication (e.g., automated driving).

TABLE 8

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz - 52600 MHz | 60, 120, 240 kHz |

Claims disclosed in the present specification can be combined in various ways. For example, technical features in method claims of the present specification can be combined to be implemented or performed in an apparatus, and technical features in apparatus claims of the present specification can be combined to be implemented or performed in a method. Further, technical features in method claims and apparatus claims of the present specification can be combined to be implemented or performed in an apparatus. Further, technical features in method claims and apparatus claims of the present specification can be combined to be implemented or performed in a method.

What is claimed is:

1. A method comprising:
    detecting, by an integrated access and backhaul (IAB) node, a first availability indication-downlink control information (AI-DCI) from a first parent node among a plurality of parent nodes; and
    detecting, by the IAB node, a second AI-DCI from a second parent node among the plurality of parent nodes,
    wherein based on resources being configured as unavailable, a distributed unit (DU) of the IAB node neither transmits nor receives in the resources configured as unavailable, and
    wherein based on resources being configured as soft resources, and based on the first AI-DCI indicating the soft resources as available and the second AI-DCI indicating the soft resources as available, the DU of the IAB node performs one of i) transmission, ii) reception or iii) either transmission or reception on the soft resources.

2. The method of claim 1, wherein based on the soft resources being in a downlink symbol configured as soft, the DU of the IAB node transmits a signal on the soft resources.

3. The method of claim 1, wherein based on the soft resources being in an uplink symbol configured as soft, the DU of the IAB node receives a signal on the soft resources.

4. The method of claim 1, wherein based on the soft resources being in a flexible symbol configured as soft, the DU of the IAB node either transmits or receives a signal on the soft resources.

5. The method of claim 1, wherein based on at least one of the first AI-DCI or the second AI-DCI not indicating the soft resources as available, the DU of the IAB node does not perform i) transmission, ii) reception or iii) either transmission or reception on the soft resources.

6. An integrated access and backhaul (IAB) node, comprising:
    at least one transceiver;
    at least one memory; and
    at least one processor operatively coupled with the at least one memory and the at least one transceiver,
    wherein the at least one memory stores instructions that, based on being executed by the at least one processor, cause the at least one processor to perform operations comprising:
    detecting a first availability indication-downlink control information (AI-DCI) from a first parent node among a plurality of parent nodes; and
    detecting a second AI-DCI from a second parent node among the plurality of parent nodes,
    wherein based on resources being configured as unavailable, a distributed unit (DU) of the IAB node neither transmits nor receives in the resources configured as unavailable, and
    wherein based on resources being configured as soft resources, and based on the first AI-DCI indicating the soft resources as available and the second AI-DCI indicating the soft resources as available, the DU of the IAB node performs one of i) transmission, ii) reception or iii) either transmission or reception on the soft resources.

7. The IAB node of claim 6, wherein based on the soft resources being in a downlink symbol configured as soft, the DU of the IAB node transmits a signal on the soft resources.

8. The IAB node of claim 6, wherein based on the soft resources being in an uplink symbol configured as soft, the DU of the IAB node receives a signal on the soft resources.

9. The IAB node of claim 6 wherein based on the soft resources being in a flexible symbol configured as soft, the DU of the IAB node either transmits or receives a signal on the soft resources.

10. The IAB node of claim 6, wherein based on at least one of the first AI-DCI or the second AI-DCI not indicating the soft resources as available, the DU of the IAB node does not perform i) transmission, ii) reception or iii) either transmission or reception on the soft resources.

11. An apparatus included in an integrated access and backhaul (IAB) node, the apparatus comprising:
   at least one memory; and
   at least one processor operatively coupled with the at least one memory,
   wherein the at least one memory stores instructions that, based on being executed by the at least one processor, cause the at least one processor to perform operations comprising:
   detecting a first availability indication-downlink control information (AI-DCI) from a first parent node among a plurality of parent nodes; and
   detecting a second AI-DCI from a second parent node among the plurality of parent nodes,
   wherein based on resources being configured as unavailable, a distributed unit (DU) of the IAB node neither transmits nor receives in the resources configured as unavailable, and
   wherein based on resources being configured as soft resources, and based on the first AI-DCI indicating the soft resources as available and the second AI-DCI indicating the soft resources as available, the DU of the IAB node performs one of i) transmission, ii) reception or iii) either transmission or reception on the soft resources.

12. The apparatus of claim 11, wherein based on the soft resources being in a downlink symbol configured as soft, the DU of the IAB node transmits a signal on the soft resources.

13. The apparatus of claim 11, wherein based on the soft resources being in an uplink symbol configured as soft, the DU of the IAB node receives a signal on the soft resources.

14. The apparatus of claim 11, wherein based on the soft resources being in a flexible symbol configured as soft, the DU of the IAB node either transmits or receives a signal on the soft resources.

15. The apparatus of claim 11, wherein based on at least one of the first AI-DCI or the second AI-DCI not indicating the soft resources as available, the DU of the IAB node does not perform i) transmission, ii) reception or iii) either transmission or reception on the soft resources.

* * * * *